US008982430B2

(12) United States Patent
Okamoto et al.

(10) Patent No.: US 8,982,430 B2
(45) Date of Patent: Mar. 17, 2015

(54) LIGHTING UNIT AND IMAGE SCANNER USING SAME

(71) Applicants: Tatsuki Okamoto, Chiyoda-ku (JP); Taku Matsuzawa, Chiyoda-ku (JP); Tadashi Minobe, Chiyoda-ku (JP); Takahito Nakanishi, Chiyoda-ku (JP)

(72) Inventors: Tatsuki Okamoto, Chiyoda-ku (JP); Taku Matsuzawa, Chiyoda-ku (JP); Tadashi Minobe, Chiyoda-ku (JP); Takahito Nakanishi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/345,305

(22) PCT Filed: Oct. 24, 2012

(86) PCT No.: PCT/JP2012/077485
§ 371 (c)(1),
(2) Date: Mar. 17, 2014

(87) PCT Pub. No.: WO2013/062010
PCT Pub. Date: May 2, 2013

(65) Prior Publication Data
US 2014/0376065 A1 Dec. 25, 2014

(30) Foreign Application Priority Data
Oct. 25, 2011 (JP) ................. 2011-234079

(51) Int. Cl.
H04N 1/04 (2006.01)
F21K 99/00 (2010.01)
(Continued)

(52) U.S. Cl.
CPC ... *F21K 9/58* (2013.01); *F21K 9/56* (2013.01); *F21K 9/52* (2013.01); *F21K 9/54* (2013.01);
(Continued)

(58) Field of Classification Search
CPC ... H01L 51/0004; F21K 9/00; F21V 29/2293; F21V 29/004; F21V 29/20; F21V 29/2212; F21V 29/2256; F21V 7/005; F21V 7/06; F21S 4/003; F21Y 2101/02; F21Y 2103/003
USPC .................. 358/474, 475, 471, 473, 496, 497
See application file for complete search history.

(56) References Cited

U.S. PATENT DOCUMENTS 5,430,484 A * 7/1995 Nagane et al. ................. 348/370
5,956,052 A * 9/1999 Udagawa et al. ............... 347/19
(Continued)

FOREIGN PATENT DOCUMENTS

JP 4 15457 3/1992
JP 7 85238 3/1995
(Continued)

OTHER PUBLICATIONS

Office Action issued Jul. 8, 2014 in Japanese Patent Application No. 2013-540807 with English language translation.
(Continued)

*Primary Examiner* — Negussie Worku
(74) *Attorney, Agent, or Firm* — Oblon, McClelland, Maier & Neustadt, L.L.P.

(57) ABSTRACT

A lighting unit includes LED chips positioned in an array form in a main scanning direction on LED substrates. Cylindrical parabolic mirrors each form a shape in which a cylindrical paraboloid having curvature with respect to an sub-scanning direction has been clipped by an axial plane that is perpendicular to the vertex of the cylindrical paraboloid in the main scanning direction, and project light emitted from the light source on an illumination area of an illuminated item. Each cylindrical parabolic mirror includes an anchoring section that is provided at the vertex of the cylindrical paraboloid, and extends from the vertex in an outside direction of the cylindrical paraboloid. Heat-radiating plates each have a contact section that is in contact with the LED substrate, and a non-contact section. Each LED substrate is interposed between the contact section of the heat-radiating plate and the anchoring section of the cylindrical parabolic mirror.

13 Claims, 25 Drawing Sheets

(51) Int. Cl.
*F21V 29/00* (2006.01)
*H04N 1/028* (2006.01)
*F21Y 103/00* (2006.01)
*F21W 131/403* (2006.01)

(52) U.S. Cl.
CPC ............ *F21V 29/22* (2013.01); *H04N 1/02815* (2013.01); *F21Y 2103/003* (2013.01); *F21W 2131/403* (2013.01)
USPC ........................... 358/474; 358/475; 358/509

(56) References Cited

U.S. PATENT DOCUMENTS

| | | | |
|---|---|---|---|
| 6,573,950 B1* | 6/2003 | Hirata et al. | 348/744 |
| 6,590,714 B2* | 7/2003 | Sugawara | 359/634 |
| 6,882,809 B2* | 4/2005 | Hirose et al. | 399/92 |
| 6,952,273 B1* | 10/2005 | Fujimoto et al. | 358/1.1 |
| 7,175,283 B2* | 2/2007 | Kitabayashi et al. | 353/54 |
| 7,360,366 B2* | 4/2008 | Namba | 62/3.7 |
| 7,378,644 B2* | 5/2008 | Kubota et al. | 250/234 |
| 7,488,104 B2* | 2/2009 | Hamada et al. | 362/616 |
| 8,224,222 B2* | 7/2012 | Mitsuoka | 399/329 |
| 8,305,651 B2* | 11/2012 | Iwayama et al. | 358/474 |
| 8,659,806 B2* | 2/2014 | Kawano et al. | 358/475 |
| 2002/0006039 A1 | 1/2002 | Ueda et al. | |
| 2005/0111115 A1 | 5/2005 | Tatsuno et al. | |
| 2008/0180774 A1 | 7/2008 | Tatsuno | |
| 2010/0110505 A1 | 5/2010 | Maruyama | |

FOREIGN PATENT DOCUMENTS

| | | |
|---|---|---|
| JP | 9 114007 | 5/1997 |
| JP | 2002 93227 | 3/2002 |
| JP | 2005 117602 | 4/2005 |
| JP | 2005 234108 | 9/2005 |
| JP | 2007 306309 | 11/2007 |
| JP | 2008 209879 | 9/2008 |
| JP | 2008 228040 | 9/2008 |
| JP | 2009 272215 | 11/2009 |
| JP | 2010 109652 | 5/2010 |
| JP | 2010 199875 | 9/2010 |
| JP | 2011 82969 | 4/2011 |
| JP | 2011 199446 | 10/2011 |

OTHER PUBLICATIONS

International Search Report Issued Jan. 8, 2013 in PCT/JP12/077485 Filed Oct. 24, 2012.

* cited by examiner

FIG.4
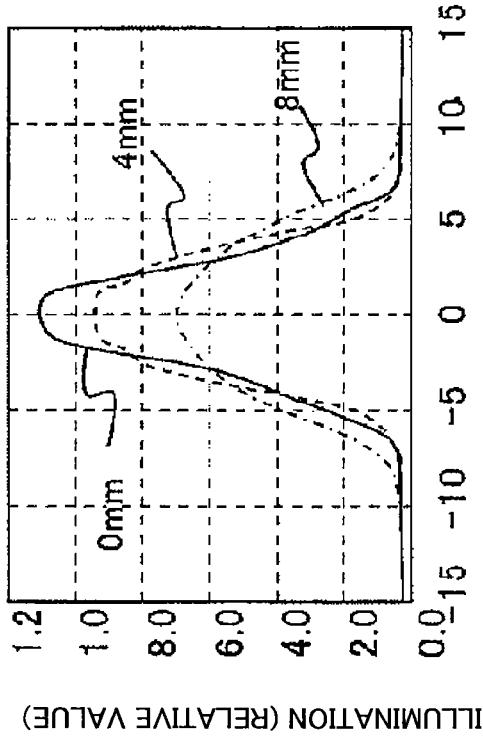
(b) TWO-SIDE LIGHTING SUB-SCANNING DIRECTION ILLUMINATION DISTRIBUTION
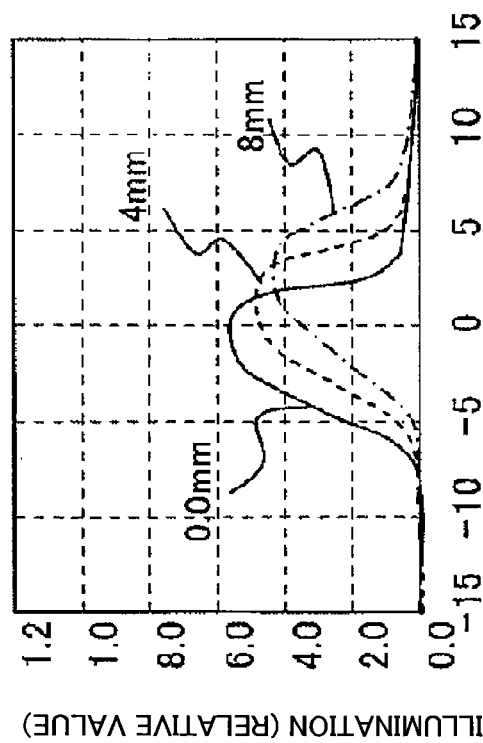
(a) ONE-SIDE LIGHTING SUB-SCANNING DIRECTION ILLUMINATION DISTRIBUTION FIG.6
(a)
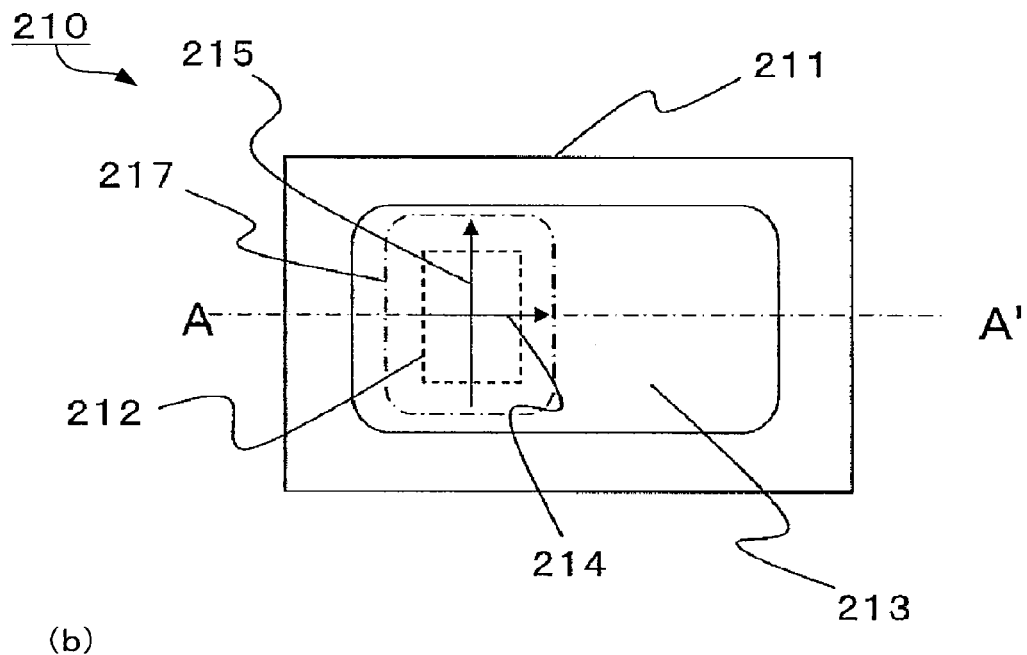
(b)
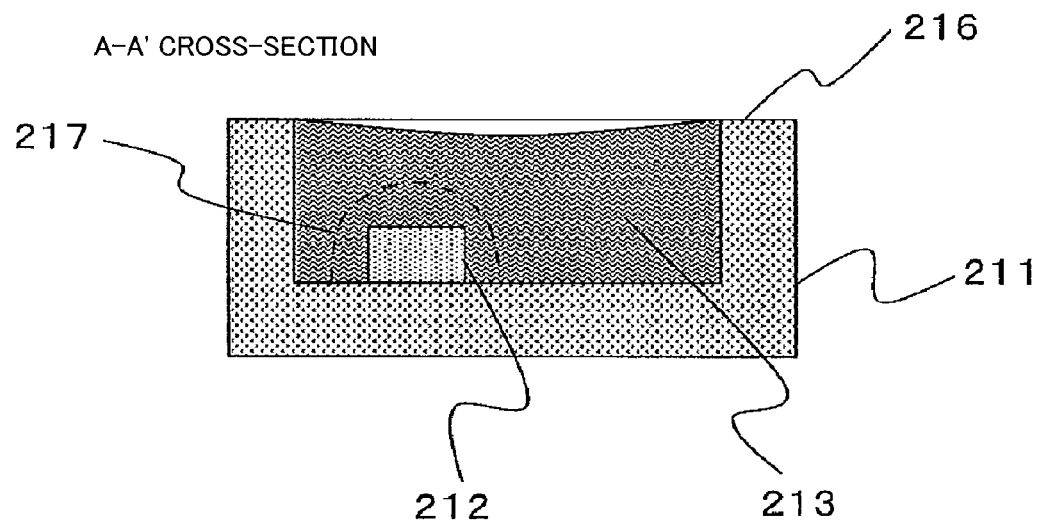

FIG.11
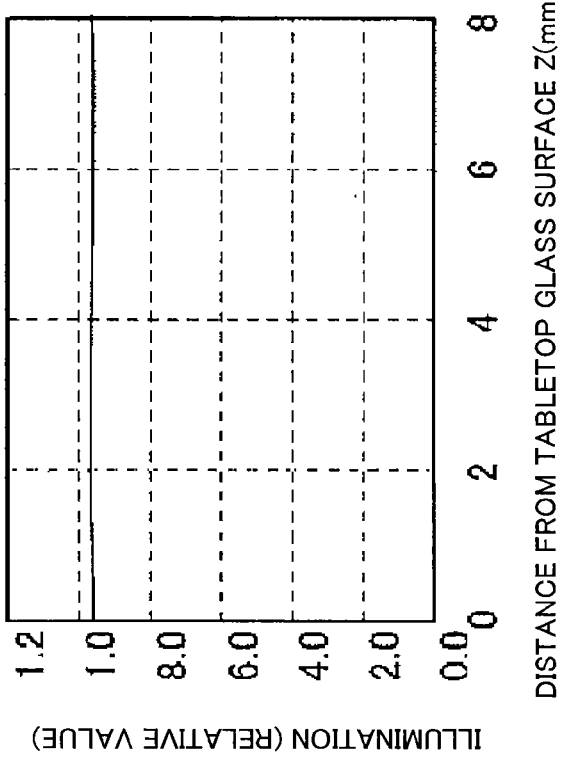
(b) DISTANCE FROM TABLETOP SURFACE AND ILLUMINATION, AT 0 mm POSITION IN SUB-SCANNING DIRECTION
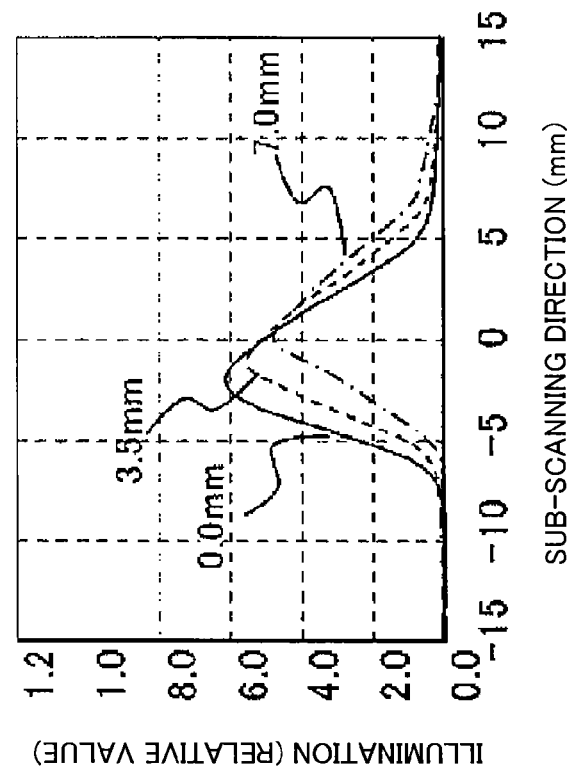
(a) ONE-SIDE LIGHTING SUB-SCANNING DIRECTION ILLUMINATION DISTRIBUTION FIG.17
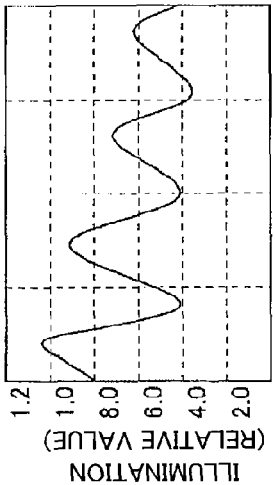
(a) ONE-SIDE LIGHTING SUB-SCANNING DIRECTION ILLUMINATION DISTRIBUTION
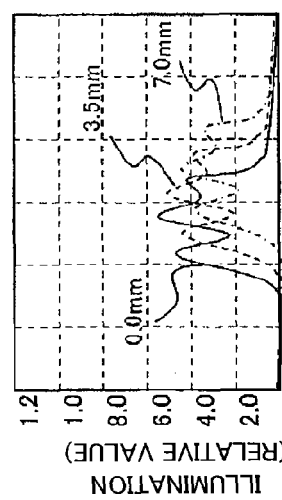
(c) ONE-SIDE LIGHTING SUB-SCANNING DIRECTION ILLUMINATION DISTRIBUTION
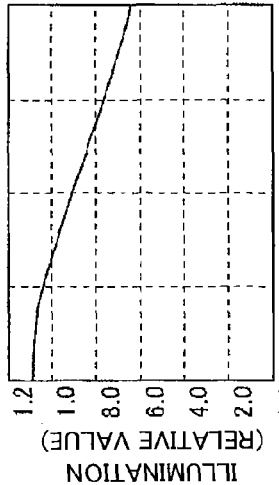
(b) DISTANCE FROM TABLETOP SURFACE AND ILLUMINATION, AT 0 mm POSITION IN SUB-SCANNING DIRECTION
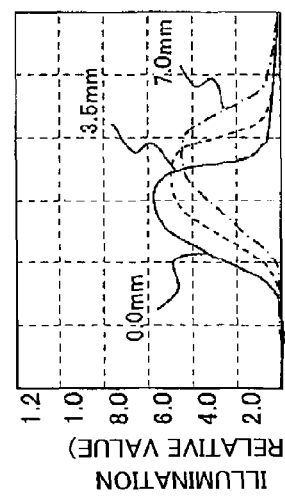
(d) DISTANCE FROM TABLETOP SURFACE AND ILLUMINATION, AT 0 mm POSITION IN SUB-SCANNING DIRECTION

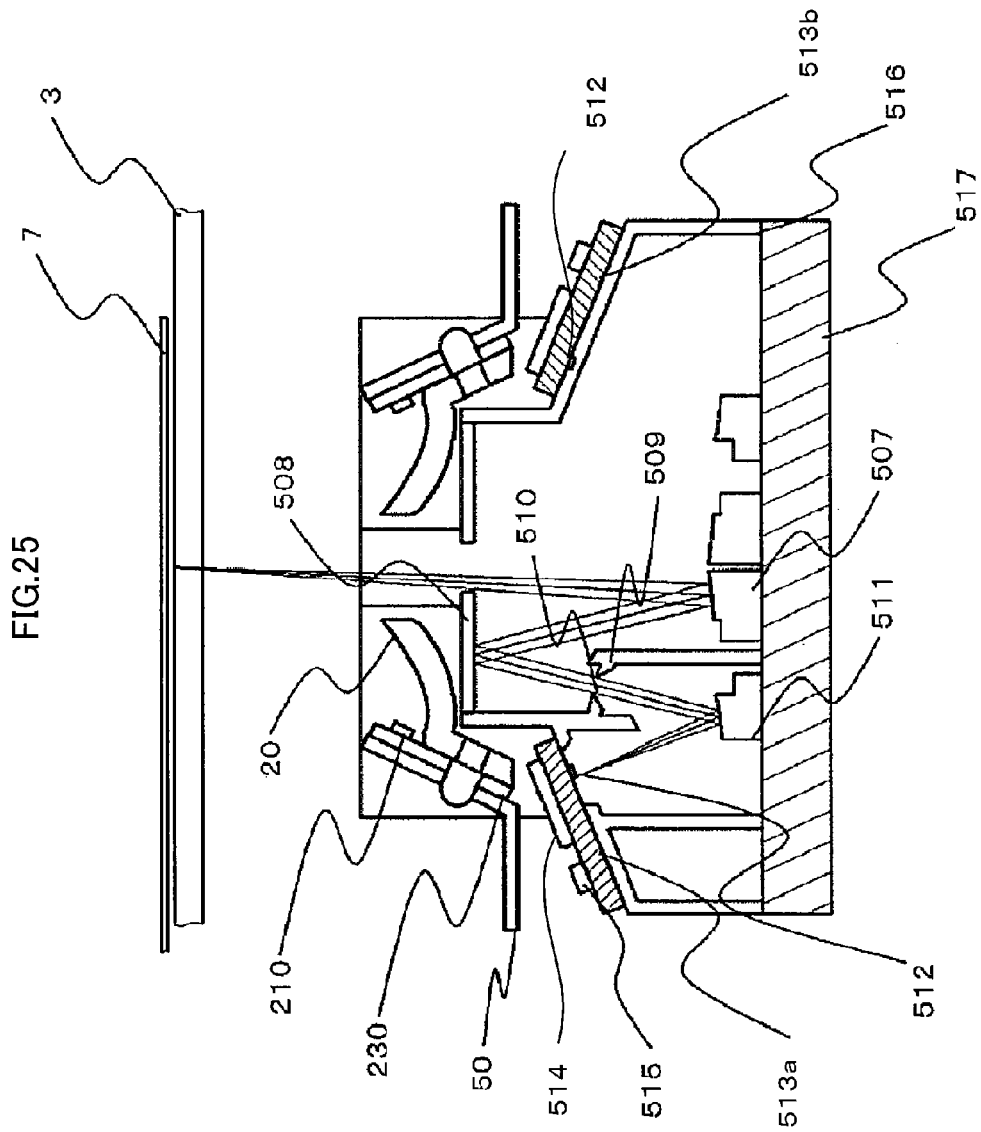

LIGHTING UNIT AND IMAGE SCANNER USING SAME

TECHNICAL FIELD

The present invention relates to a lighting unit for accomplishing linear lighting of scanned items, such as printed material or book manuscripts, and to an image scanning device using this lighting unit.

BACKGROUND ART

Image scanning devices are used in copiers, scanners, facsimiles and/or the like. The image scanning device is a device for scanning an entire image by scanning the image in a scanning position using a one-dimensional imaging element, and is provided with a lighting unit for accomplishing lighting when reading an original. In the image scanning device, it is necessary to scan the image information with good accuracy and at high speed, so a lighting unit composition has been disclosed for uniformly lighting the original with high efficiency. As general expressions, the direction in which a one-dimensional imaging element is arrayed is called the main scanning direction, and the direction of scanning is called the sub-scanning direction. In addition, the direction orthogonal to both the main scanning direction and the sub-scanning direction is called the focal depth direction in a scanning optical system and is called the lighting depth direction in a lighting unit.

The document lighting unit disclosed in Patent Literature 1 is provided with point light sources such as multiple LEDs (Light Emitting Diodes) arranged in the main scanning direction. The direction in which light is emitted from these point light sources is roughly parallel to the normal direction to the document stand on which a document is loaded and is in the opposite direction from the document stand. Light from these point light sources is guided to the document surface as lighting light by multiple reflective surfaces arranged facing the point light sources.

The condensing lighting device disclosed in Patent Literature 2 is provided with a light source positioned at the focal position of a reflective surface on a parabola, and a lens having two types of curvature for condensing light from the light source and light from the reflective surface.

The document lighting device disclosed in Patent Literature 3 is provided with LED elements disposed along the main scanning direction, and a reflective plate surrounding the LED elements. The shape of this reflective plate is a parabolic two-dimensional curve.

Patent Literature 4 discloses the composition of a light guide, lighting unit and image-scanning lighting device capable of realizing lighting with high illumination, large lighting depth and broad lighting width in the sub-scanning direction.

Patent Literature 5 discloses an image scanning device in which a circuit substrate on which light-emitting diodes are provided is anchored to a metal support section, and the support section is carriage-anchored.

CITATION LIST

Patent Literature

Patent Literature 1: Unexamined Japanese Patent Application Kokai Publication No. 2010-199875 (FIGS. 1-9)
Patent Literature 2: Japanese Patent Official Announcement No. H4-15457 (FIGS. 1-3)
Patent Literature 3: Unexamined Japanese Patent Application Kokai Publication No. 2005-234108 (FIGS. 1, 2)
Patent Literature 4: Unexamined Japanese Patent Application Kokai Publication No. 2009-272215 (FIG. 3)
Patent Literature 5: Unexamined Japanese Patent Application Kokai Publication No. 2007-306309 (FIG. 4)

SUMMARY OF INVENTION

Technical Problem

In the image scanning device, it is necessary to have a lighting device with a large lighting depth when utilizing a scanning optical system having a large focal depth enabling clear imaging of images of scanned objects having unevenness on the surface, such as book manuscripts or wrinkled paper money. When scanning documents having unevenness, fluctuations in the brightness of the scanned images occur when there is a brightness distribution in the lighting depth direction.

The document lighting unit disclosed in Patent Literature 1 comprises multiple reflective surfaces, so the angular component of the lighting light rays toward the document surface from the respective reflective surfaces with respect to the document stand has multiple peaks. As a result, it is difficult to achieve lighting with uniform illumination of a document whose distance from the document stand changes, such as a book manuscript and/or the like.

With the lighting device disclosed in Patent Literature 2, it is possible for the lighting light rays to approach parallel light rays as a result of a combination of parabolas and lenses, so lighting with uniform illumination is relatively easy on documents in which the distance from the document stand changes, such as book manuscripts and/or the like. However, the lighting device disclosed in this Patent Literature comprises a parabolic reflective mirror and lenses having two types of curvature, so the size of the optical system becomes large and compactness of the lighting device is difficult to realize, and cost also becomes an issue.

With the lighting device disclosed in Patent Literature 3, the LED elements are lined up in the main scanning direction, reflective plates surrounding the LED elements are provided and the shape of the reflective plates is a parabolic two-dimensional curve. Consequently it is possible for the lighting light rays to approach parallel light rays, so that lighting with uniform illumination is relatively easy on documents such as book manuscripts and the like whose distance from the document stand changes. However, in order to provide the reflective plates surrounding the LED elements, the optical system becomes large and making the lighting device compact becomes difficult.

In Patent Literature 4, a composition is disclosed in which parallel light rays are produced using a light guide.

In Patent Literature 5, an image scanning device is disclosed in which a circuit board on which light-emitting diodes are provided is anchored to a metal support member and the support member is carriage-anchored. In the case of this kind of composition, heat emitted by the light-emitting diodes is discharged toward the carriage via the support member, so the temperature of the carriage rises and the temperature of other electronic components provided on the carriage rises. As a result, the problem existed that deterioration of performance occurs.

It is an objective of the present invention to provide a high-illumination lighting unit and image scanning device that control temperature increases in the light source and/or the like caused by heat discharged from the light source while having large lighting depth.

Solution to Problem

The lighting unit according to the present invention comprises:

a light source in which light-emitting elements are positioned in an array in a main scanning direction;

a light source substrate that is a substrate extending in the main scanning direction and comprises a light-emitting element mounting section on which the light source is disposed and a non-light-emitting element mounting section extending from the light-emitting element mounting section in a direction orthogonal to the main scanning direction;

a parabolic mirror forming a shape in which a cylindrical paraboloid having curvature with respect to an sub-scanning direction has been clipped by an axial plane that is perpendicular to the vertex of the cylindrical paraboloid in the main scanning direction, provided with an anchoring section provided at the vertex of the cylindrical paraboloid and extending in the outside direction of the cylindrical paraboloid from the vertex, and projecting light emitted from the light source on an illumination region of an illuminated item; and a heat-radiating plate extending in the main scanning direction and possessing a contact section that is in contact with the surface opposite the surface on which the light-emitting elements of the light source substrate are mounted, and a non-contact section;

wherein the light source is positioned so as to include the focal position of the cylindrical paraboloid in the light-emitting region of light, the central axis in the light-emitting direction of the light being perpendicular to the axial plane; and the non-light-emitting element mounting section of the light source substrate is interposed between the contact section of the heat-radiating plate and the anchoring section of the parabolic mirror.

Advantageous Effects of Invention

With this invention, lighting of a document by roughly parallel light rays is possible, so it is possible to efficiently light documents. In addition, changes in the light quantity are small in the lighting depth direction, so it is possible to obtain bright images even when the distance to the document is distant. Furthermore, by positioning this kind of lighting unit on both sides of the optical axis of a scanning optical system, linear lighting having large lighting depth and uniformly strong distribution even in the sub-scanning direction is obtained.

BRIEF DESCRIPTION OF DRAWINGS

FIG. 4 is an example of an sub-scanning direction illumination distribution according to the first preferred embodiment of the present invention;

FIG. 6 is a structural diagram of a white LED obtaining white light by blending secondary luminescence through yellow fluorescent material with a blue light-emitting diode as the light source, with (a) being a view from the LED light-emission direction along the central axis thereof, and (b) being a cross-sectional view taken along line A-A' in (a) of FIG. 6;

FIG. 11 is an example of the sub-scanning direction illumination distribution according to the fourth preferred embodiment of the present invention;

FIG. 17 is an example of the sub-scanning direction illumination distribution according to the seventh preferred embodiment of the present invention;

FIG. 25 is a sub-scanning direction cross-sectional view of an image scanning device according to the twelfth preferred embodiment of the present invention.

DESCRIPTION OF EMBODIMENTS

Below, the preferred embodiments of the present invention are described with reference to the drawings Compositional parts that are the same or similar in each drawing are labeled with the same reference signs.

First Preferred Embodiment

Figure 1:
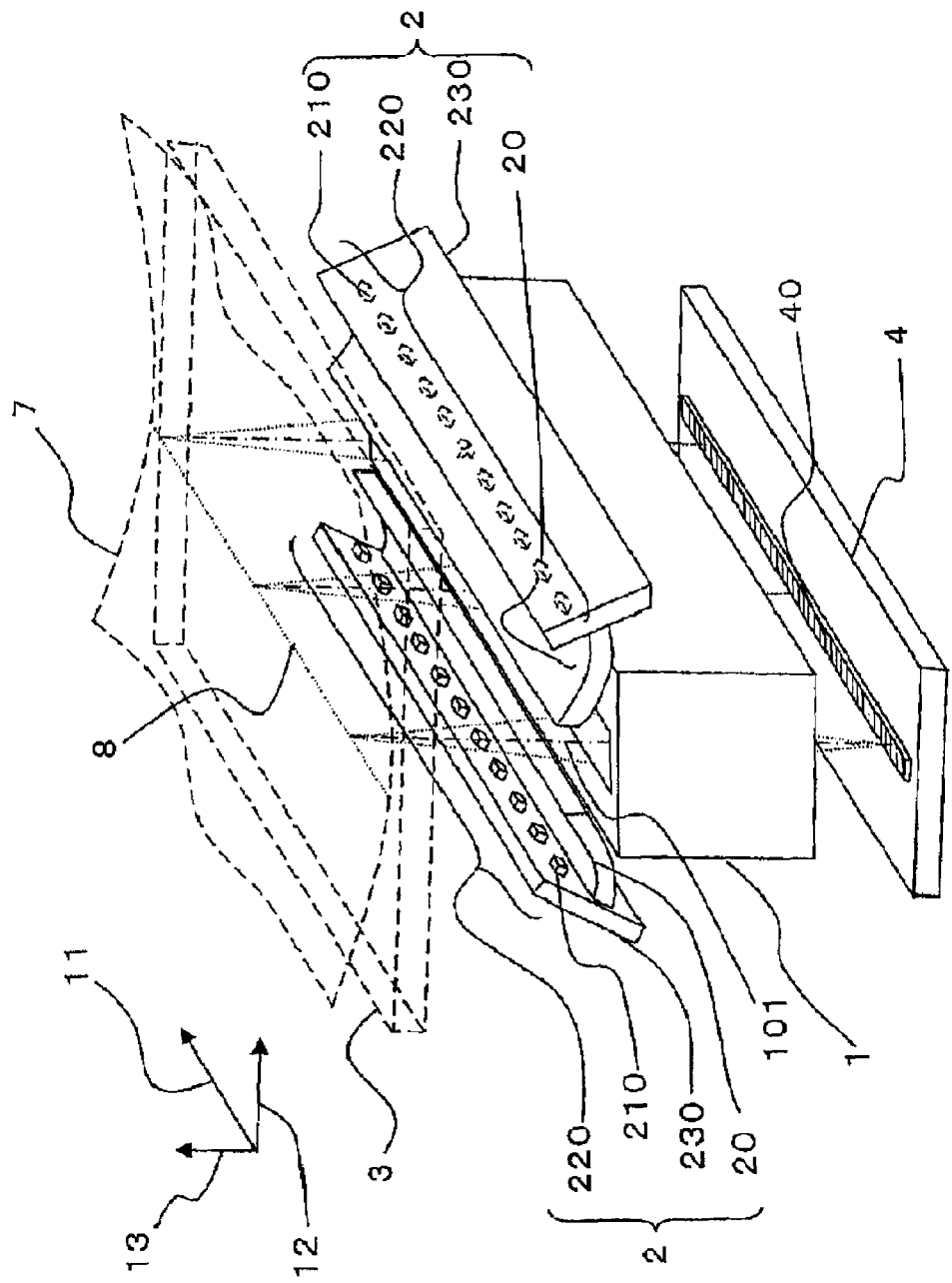
FIG. 1 is a perspective view showing an image scanning device according to a first preferred embodiment of the present invention.

FIG. 1 is a perspective view of an image scanning device according to a first preferred embodiment of the present invention. The image scanning device comprises a top glass sheet 3, a lighting unit 2 and an imaging optical system 1. The top glass sheet 3 is a transparent glass sheet for supporting a scanned item (illuminated item) such as a document 7 and/or the like. The lighting unit 2 is a unit for accomplishing linear lighting of a surface of the document 7. The imaging optical system 1 is a unit for imaging light from the document 7 in an imaging element 40.

To facilitate understanding, the direction of scanning the document through electrical scanning of the imaging element 40 shall be called the main scanning direction 11, the direction in which the document 7 moves relative to the image scanning device shall be called the sub-scanning direction 12 and the direction perpendicular to the main scanning direction 11 and the sub-scanning direction 12 shall be called the depth direction 13. Here, the depth direction 13 is such that the direction in which the document 7 is separated from the top glass sheet 3 is the positive (+) direction.

In this preferred embodiment, a composition is shown such that the image scanning device moves and accomplishes document scanning with the document 7 in an anchored state, but conversely, it would be fine to have a composition in which document scanning is accomplished by moving the document 7 with a drum conveyor and/or the like with the image scanning device in an anchored state.

The imaging optical system 1 is positioned along a light path facing from the document 7 to the imaging element 40, and comprises a lens array and reduction optical system, and/or the like. The imaging element 40 is mounted on a substrate 4 and is a line sensor constituting a photoelectric conversion circuit for photoelectric conversion and a CMOS (Complementary Metal Oxide Semiconductor), CCD (Charge Coupled Device Image Sensor) and/or the like comprising the driver thereof.

The lighting unit 2 is positioned between the top glass sheet 3 and the imaging optical system 1 and accomplishes linear lighting along a scan line 8 along the x-direction to the surface of the document 7 by shining light onto the document 7 positioned on top of the top glass sheet 3.

In addition, the lighting unit 2 comprises an LED array 220, an LED substrate 230 and a cylindrical parabolic mirror 20. The LED array 220 comprises LED chips 210 that are LED light sources, lined up linearly in the main scanning direction. The LED substrate 230 is a substrate on which the LED array 220 is mounted. The cylindrical parabolic mirror 20 is a cylindrical concave mirror that makes light emitted from the LED array 220 roughly parallel light rays and emits this lighting light toward a scan line 8.

Figure 2:
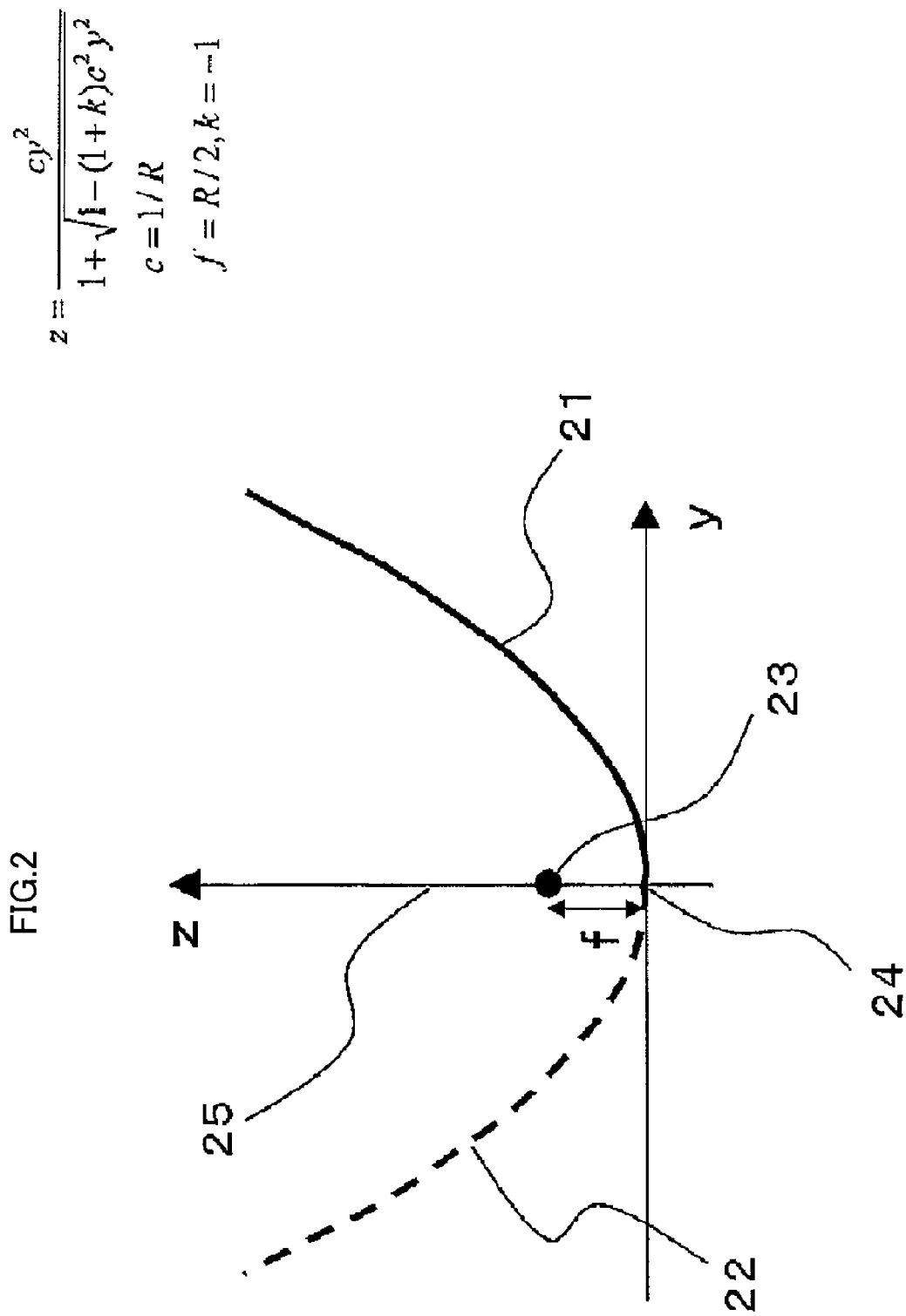
FIG. 2 is a drawing showing a parabolic shape equating to the sub-scanning direction cross-sectional shape of a cylindrical parabolic mirror.

The cylindrical parabolic mirror 20 has curvature in the sub-scanning direction 12 and has no curvature in the main scanning direction 11. FIG. 2 shows a parabolic shape equating to the sub-scanning direction cross-sectional shape of the cylindrical parabolic mirror 20. In FIG. 2, the tangential direction at the vertex 24 of the parabola, that is to say at y=0 and z=0, is taken as the y direction and the normal direction is taken as the z direction. The parabola is given by the following equation (Equation 1), where f is the focal length and y=0 and z=f is the cylindrical parabola focal position 23.

[Equation 1]

$$z = \frac{cy^2}{1 + \sqrt{1 - (1+k)c^2 y^2}} \quad \text{(Equation 1)}$$
$$c = 1/R$$
$$f = R/2, k = -1$$

In addition, as shown in FIG. 2, the cylindrical parabolic mirror 20 is formed of only a semi-cylindrical parabola y+21 when the parabola is divided at y=0 and the y+ direction is considered a semi-cylindrical parabola y+21 and the y− direction is considered a semi-cylindrical parabola y−22. Here, the z axis is called the axis of the parabola, and the surface orthogonal to the y axis and including the axis of the parabola is called the cylindrical parabola axial plane 25.

Figure 3:
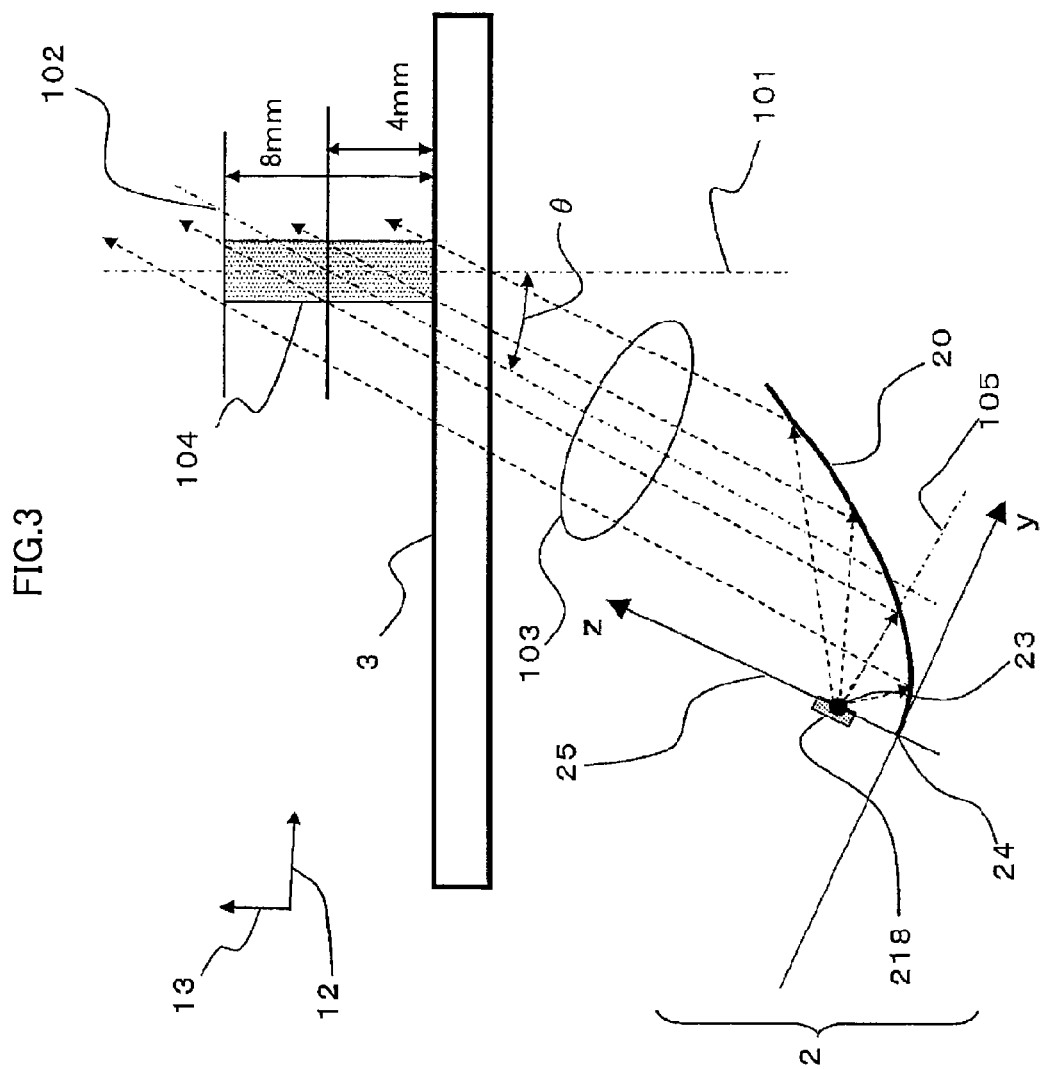
FIG. 3 is a light path diagram of the sub-scanning direction cross-section of the lighting unit according to the first preferred embodiment of the present invention.

FIG. 3 shows a light path diagram of the sub-scanning direction cross-section according to the first preferred embodiment of the present invention. In FIG. 3, the case where the lighting unit 2 is positioned to one side of an imaging optical axis 101 is shown. In order to avoid interference with the imaging optical axis 101, the lighting unit 2 needs to be such that in general a lighting optical axis 102 is inclined from the imaging optical axis 101. Furthermore, because there could be assembly errors in the lighting unit 2 and the imaging optical system 1, a lighting region 104 is a region widening in the sub-scanning direction 12, and moreover, in order to cope with book manuscripts and wrinkles in and floating of the document, when the focal depth becomes larger, the lighting region 104 broadens in the depth direction 13 as well. Consequently, in the lighting unit 2 there is a certain degree of width in the sub-scanning direction 12, and uniform, substantially parallel light rays are necessary. Furthermore, when a certain degree of width in the sub-scanning direction 12 is secured, illumination drops and the scanning speed becomes slower, so it is necessary to improve the usage efficiency of the LED light.

Hence, with the first preferred embodiment of the present invention, an LED light-emission region 218 is positioned at a position including the cylindrical parabola focal position 23. Lighting light rays 103 emitted from the cylindrical parabola focal position 23 are reflected by the cylindrical parabolic mirror 20, become parallel light rays, pass through the top glass sheet 3 and reach the lighting region 104. A central axis 105 in the light-emission direction of the LED is positioned in a direction perpendicular to the cylindrical parabolic mirror 24. Because the LED's light emission intensity is at a maximum on the central axis 105 of the light-emission direction of the LED, it is possible for LED light to be efficiently incident on the cylindrical parabolic mirror 20.

Accordingly, with this composition, lighting light close to parallel light is efficiently obtainable, so it is possible to efficiently light the document 7 and it is also possible to reduce changes in light amounts in the lighting depth direction. Consequently, even when the distance between the document 7 and the top glass sheet 3 is distant, it is possible to obtain a bright image.

FIG. 4 shows an sub-scanning direction illumination distribution according to the first preferred embodiment of the present invention. FIG. 4(a) shows the sub-scanning direction illumination distribution when the lighting unit 2 is positioned to one side of the imaging optical axis 101, as shown in FIG. 3. In lighting by only the lighting unit on one side, the sub-scanning direction illumination distribution is an asymmetrical distribution with respect to the sub-scanning direction 12, and when the imaging optical axis 101 and the lighting optical axis 102 are shifted due to assembly errors and/or the like, illumination on the imaging optical axis 101 changes. In contrast, FIG. 4(b) shows the sub-scanning direction illumination distribution when the lighting unit 2 is positioned on both sides of the imaging optical axis 102. The sub-scanning direction illumination distribution becomes the sum of the lighting light from the lighting unit 2 on both sides and thus is a symmetrical illumination distribution with respect to the sub-scanning direction 12.

Accordingly, with this composition it is possible to change illumination in the depth direction by setting the intersection position of optical axes of lighting units on both sides.

It would also be fine to set the illumination distribution of lighting units on both sides symmetrical with respect to the imaging optical axis 101.

For example, when the size of the illumination region 104 is taken to be 1 mm in the sub-scanning direction and 8 mm in the depth direction, and when the inclination θ of the lighting optical axis 102 to the imaging optical axis 101 is 20°-30°, the focal length f of the cylindrical parabolic mirror 20 is appropriately around 10 mm to 20 mm.

Second Preferred Embodiment

Figure 5:
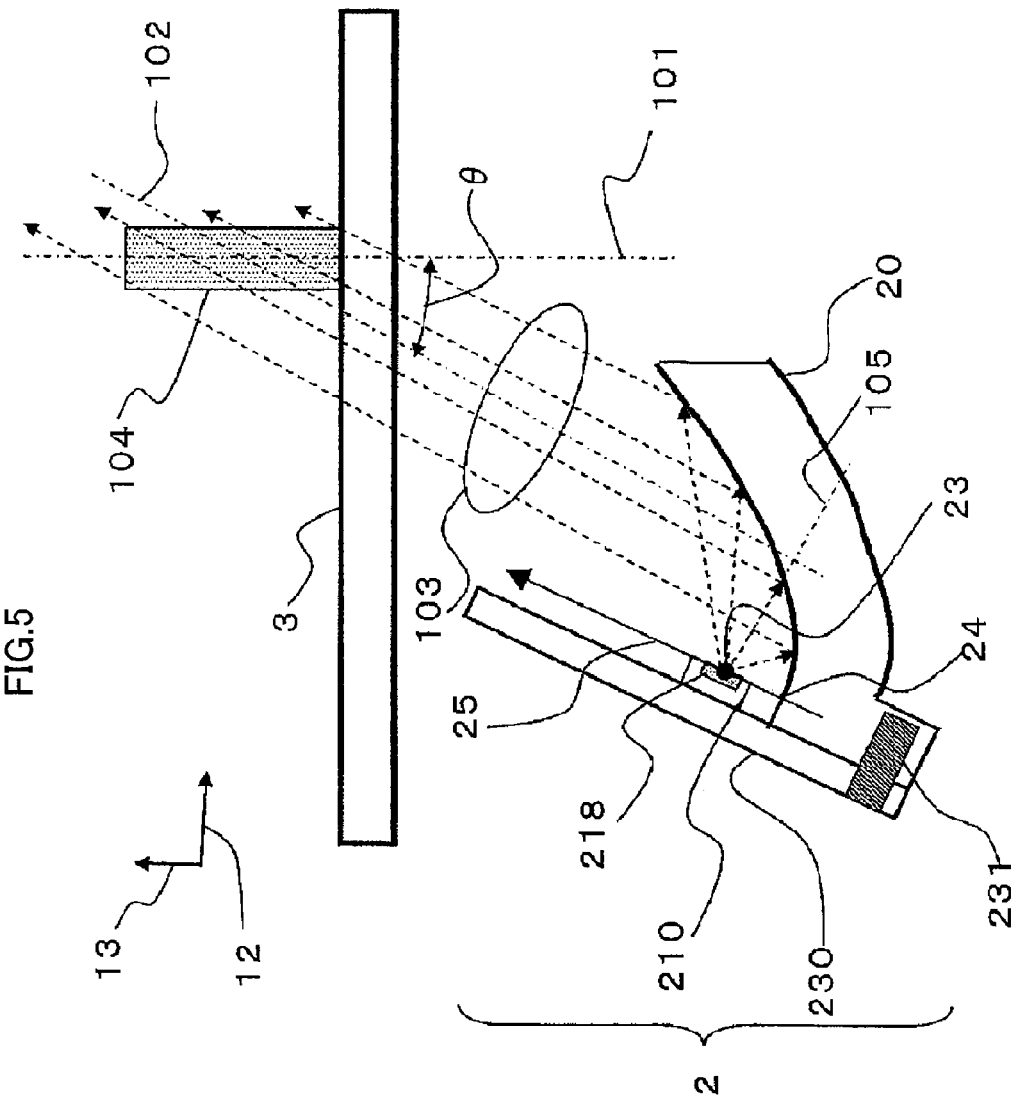
FIG. 5 is a sub-scanning direction cross-section of a lighting unit according to a second preferred embodiment of the present invention.

FIG. 5 is an sub-scanning direction cross-sectional view of a lighting unit according to a second preferred embodiment of the present invention. In the second preferred embodiment of the present invention, the cylindrical parabolic mirror 20 and the LED substrate 230 are positioned using a position-determining pin 231. Through this it is possible to accurately align the positional relationship of the cylindrical parabolic mirror 20 and the LED light-emission region 218. As a result, the parallelism of the lighting light is maintained, it is possible to control scattering in the lighting direction and it is possible to reduce scattering of brightness in scanning.

Third Preferred Embodiment

FIG. 6 is a structural diagram of a white LED obtaining white light by blending secondary luminescence from yellow fluorescent material, with a blue light-emitting diode as the light source. The white LED is such that there are depressions in an LED package 211, a blue light-emitting diode 212 is mounted and a yellow fluorescent material 213 is loaded so as to fill the surrounding depressions. A portion of the light emitted from the blue light-emitting diode 212 is emitted to the outside of the LED package 211 without change and becomes blue light comprising white light. In addition, the other portion of the light emitted from the blue light-emitting diode 212 is absorbed by the yellow fluorescent material and the yellow fluorescent material emits light in the region from green to red. This becomes green to red light that comprises white light. Accordingly, the blue light-emission region becomes the region of the blue light-emitting diode 212 and the red to green light-emission region becomes the entire yellow fluorescent material region. That is to say, the blue light and the red to green light have different light-emission regions.

In order to produce parallel light rays with less divergence using the cylindrical parabolic mirror 20, it would be well to cause the center of the light-emission region to match the cylindrical parabola focal position 23. However, when the light-emission regions of blue light and red to green light differ as described above, it is necessary to change the cylindrical parabola focal position 23 depending on wavelength, but realizing this kind of composition is difficult.

On the other hand, in observation by the inventors, it was learned that there is a yellow fluorescent material strong light-emission region surrounding the blue light-emitting diode 212. Accordingly, it is fine to think of the green to red light-emission region as being around the blue light-emitting diode 212, and in order to efficiently make light of all wavelengths into parallel light rays, the conclusion was reached that it would be well to make the light-emission region of the blue light-emitting diode 212 the standard.

Figure 7:
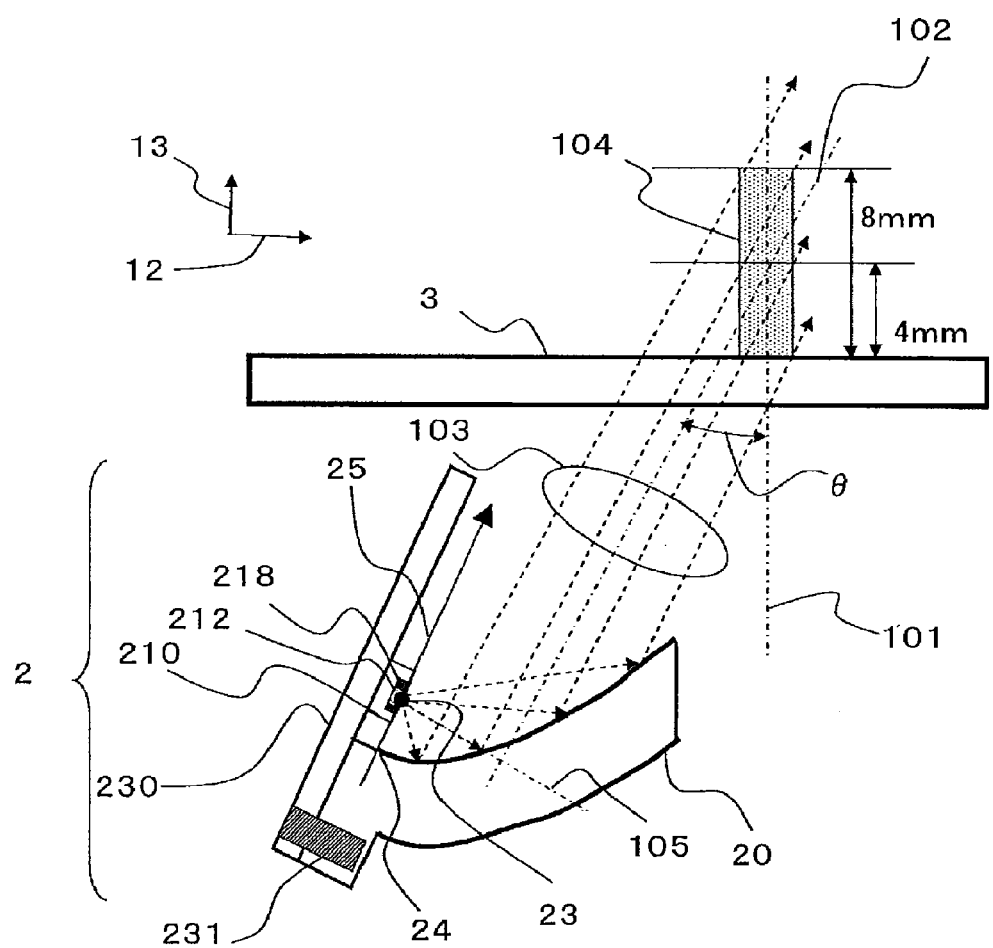
FIG. 7 is a sub-scanning direction cross-sectional view of a lighting unit according to a third preferred embodiment of the present invention.
Figure 8:
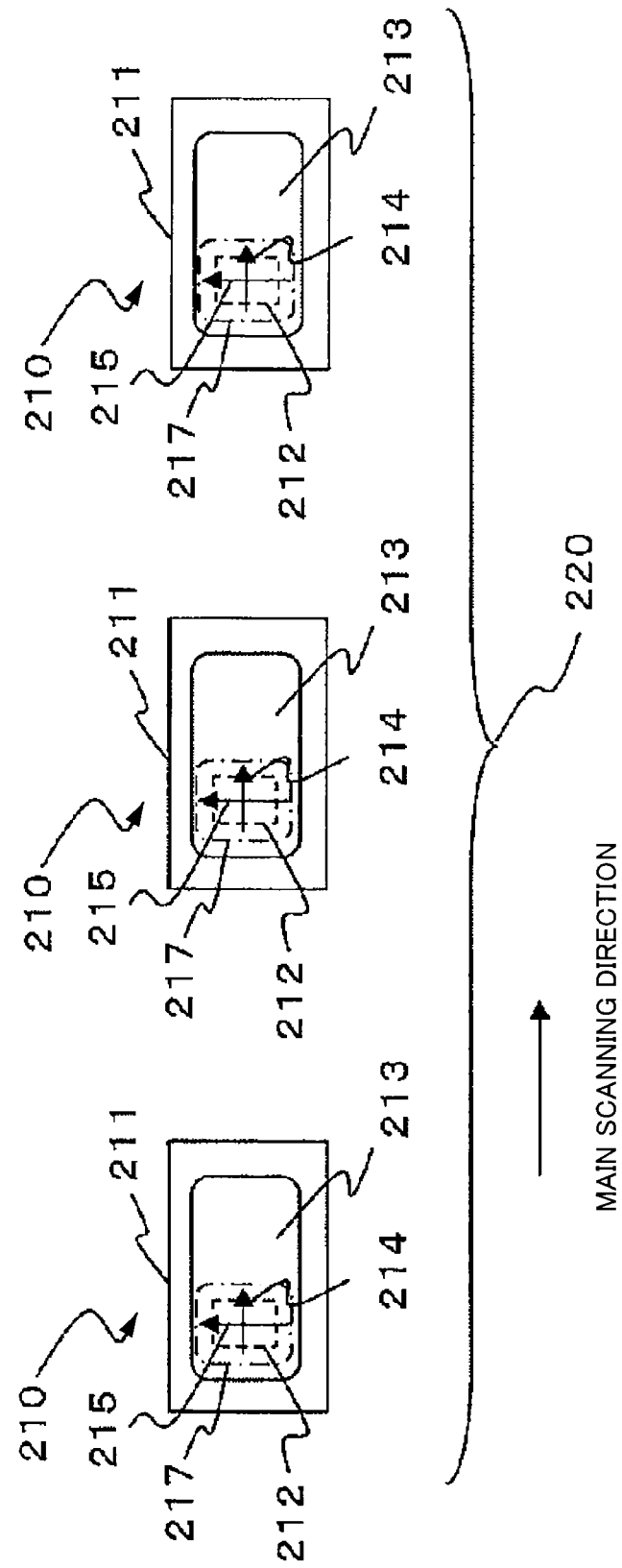
FIG. 8 is a drawing showing the arrangement direction of an LED array according to the third preferred embodiment of the present invention.

FIG. 7 is an sub-scanning direction cross-sectional view of a lighting unit according to the third preferred embodiment of the present invention. When the LED chip shown in FIG. 6 is used, it is necessary to shine light having a broad illumination depth in the sub-scanning direction 12 in the lighting region 104 in order to increase the lighting depth. Consequently, it is fine to use a light source with a broad light-emission region width, and it is fine for the direction in which LED chips 210 are arrayed in the LED array 220 to be such that the blue light-emitting diode long axis 215 matches the cylindrical parabolic mirror axial plane direction, as shown in FIG. 8.

Figure 9:
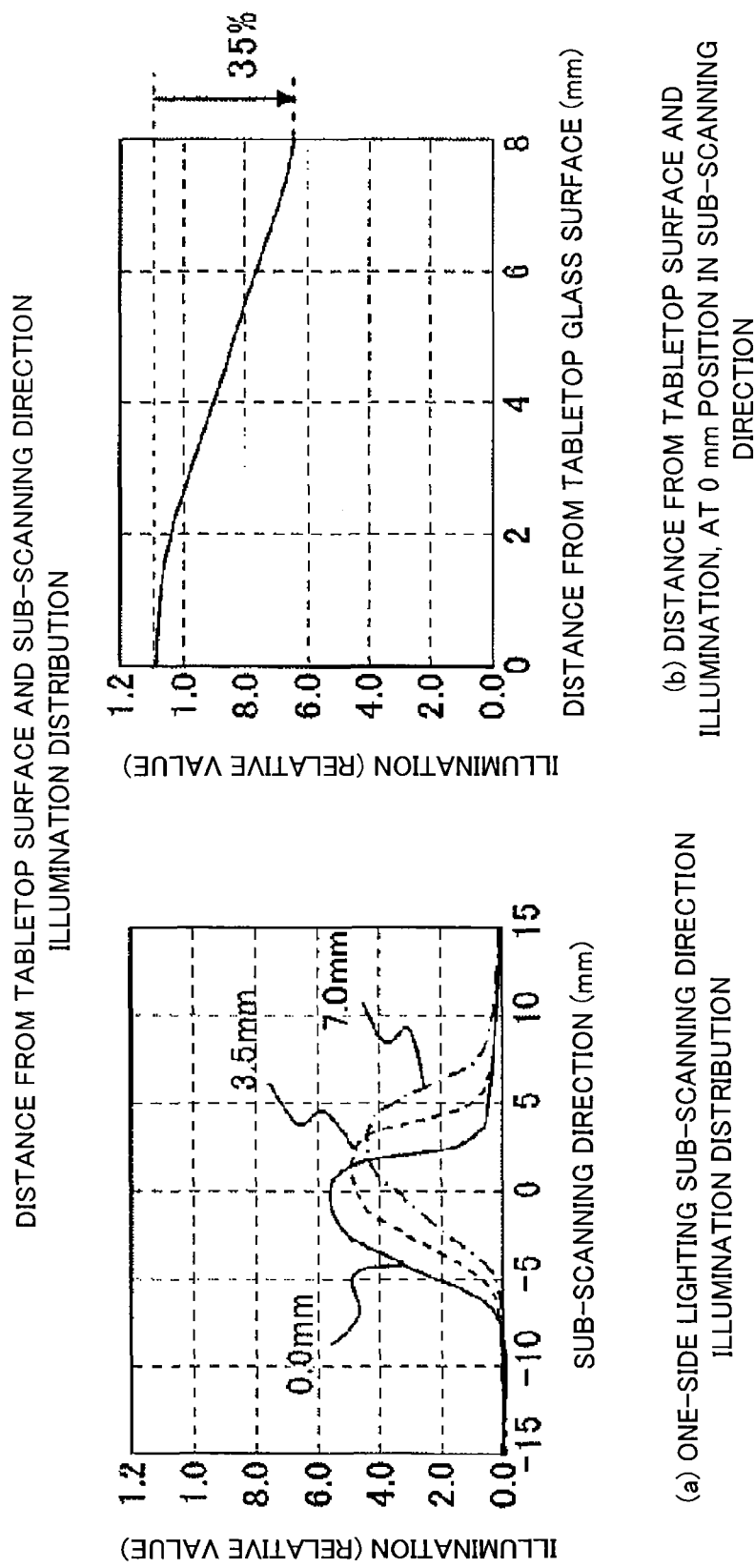
FIG. 9 is an example of the sub-scanning direction illumination distribution according to the third preferred embodiment of the present invention.

FIG. 9 is an example of computation of the sub-scanning direction illumination distribution on the top glass sheet 3 when the center of the blue light-emitting diode 212 is caused to match the cylindrical parabolic mirror focal position 23. FIG. 9 (a) shows the sub-scanning direction distribution, while FIG. 9 (b) shows the illumination change in the depth direction when the sub-scanning direction is at the center of the lighting region. By causing the blue light-emitting diode long axis 215 to match the cylindrical parabolic mirror axial plane direction, the illumination peak in the sub-scanning direction becomes relatively flat and the lighting width in the sub-scanning direction is widened. At this time, the lighting illumination 8 mm above the top glass sheet is reduced around 35% compared to the lighting illumination on (0 mm above) the top glass sheet.

With this kind of composition, it is possible to reduce changes in the depth direction of the sub-scanning direction illumination distribution between the blue light and the green to red light. As a result, it is possible to control color spotting.

Fourth Preferred Embodiment

Figure 10:
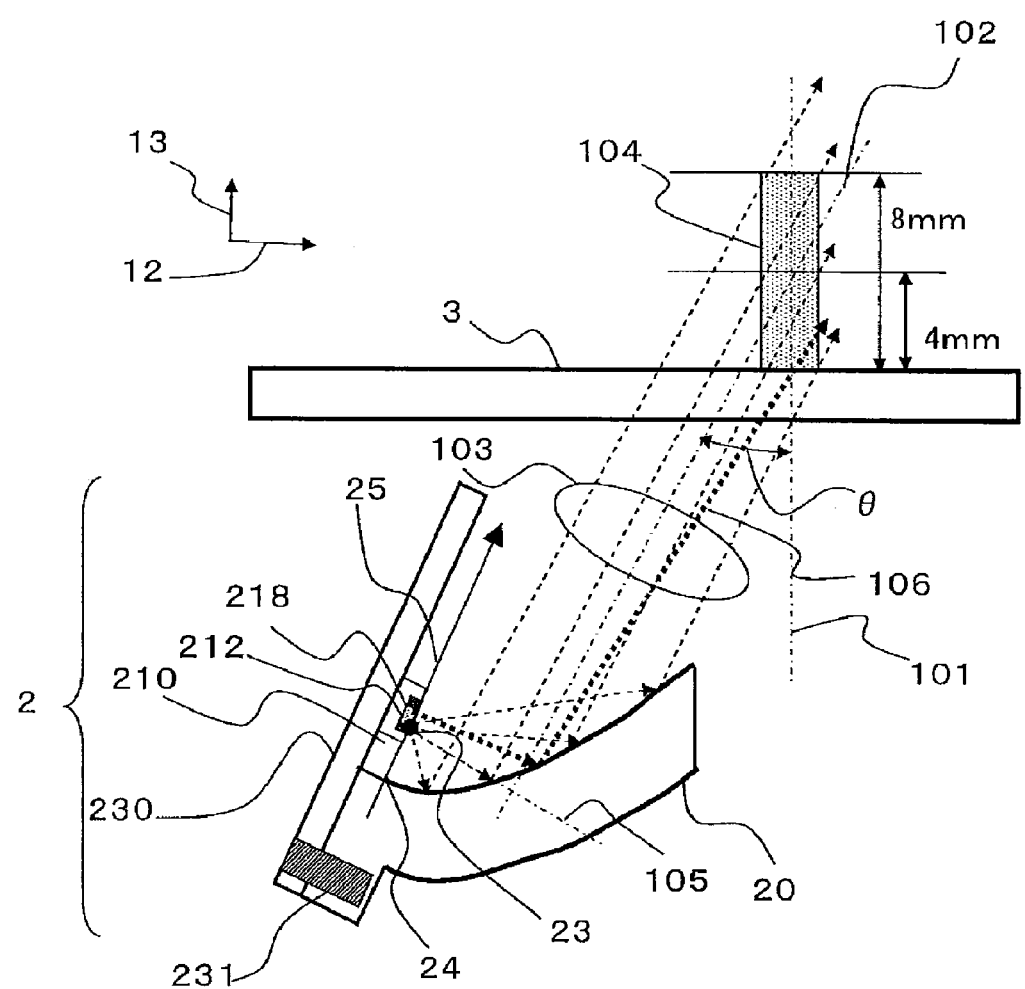
FIG. 10 is a sub-scanning direction cross-sectional view of a lighting unit according to a fourth preferred embodiment of the present invention.

FIG. 10 is an sub-scanning direction cross-sectional view of a lighting unit according to a fourth preferred embodiment of the present invention. Compared to the above-described third preferred embodiment, the fourth preferred embodiment has a composition that further controls lowering of the lighting illumination in the lighting depth direction. In FIG. 10, the composition is such that the cylindrical parabolic mirror focal position 23 is caused to match the side of blue light-emitting diode 212 on the cylindrical parabolic mirror vertex 24 side.

With this kind of composition, the light rays emitted from the side of the light-emitting diode 212 on the cylindrical parabolic mirror vertex 24 side are turned into parallel light rays by the cylindrical parabolic mirror 20 and are guided to the lighting region. On the other hand, light rays emitted from the side of the blue light-emitting diode 212 on the opposite side of the cylindrical parabolic mirror vertex 24 become light rays 106 inclined in the sub-scanning direction from the lighting optical axis 102 and are guided to the lighting region 104. As a result, the lighting distribution in the sub-scanning direction is such that the slope on the + side in the sub-scanning direction becomes gentle, as shown in FIG. 11(a).

Hence, the farther from the top glass sheet 3 in the depth direction, the more the peak illumination position in the sub-scanning direction distribution moves to the sub-scanning direction positive (+) direction, following the lighting optical axis angle θ. Consequently, by appropriately setting the position of the lighting unit 2 and the lighting optical axis angle θ, it is possible to cause each position in the depth direction on the imaging optical axis 101, as shown in FIG. 11 (a), and illumination at 0 mm, 4 mm and 8 mm in FIG. 11 (a), to match. As a result, it is possible to make the lighting illumination at 8 mm above the top glass sheet to be virtually equal compared to the lighting illumination on (0 mm above) the top glass sheet, as shown in FIG. 11 (b).

Accordingly, with this composition it is possible to asymmetrically dim the lighting illumination depth in the sub-scanning direction, so it is possible to further reduce the amount of change in the lighting illumination distribution in the sub-scanning direction of the depth direction of the blue light and the green to red light caused by the fact that the light-emission regions differ.

Fifth Preferred Embodiment

Figure 12:
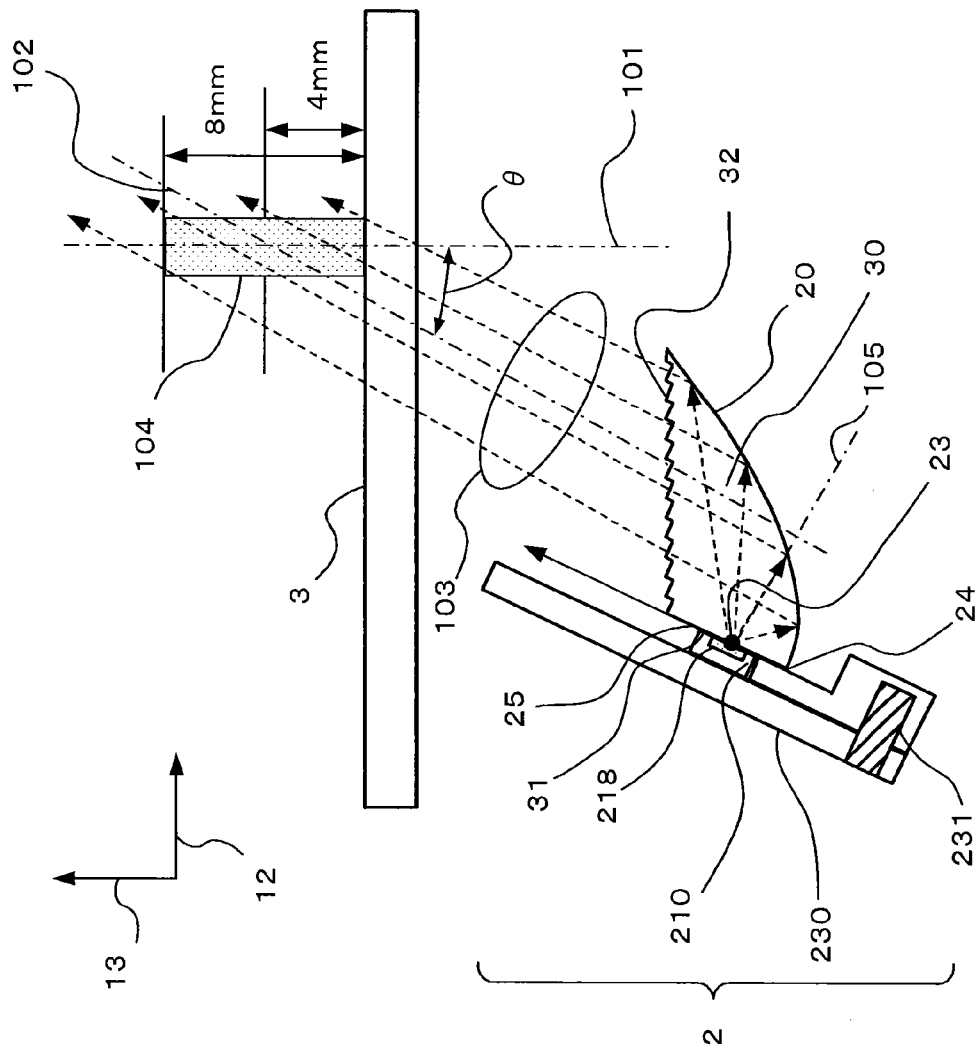
FIG. 12 is a cross-sectional view of a lighting unit according to a fifth preferred embodiment of the present invention.

FIG. 12 is a cross-sectional view of a lighting unit according to a fifth preferred embodiment of the present invention. The lighting unit according to this fifth preferred embodiment of the present invention uses as the cylindrical parabolic mirror a cylindrical parabolic block 30 that is a real block formed of transparent resin. Similar to the first preferred embodiment, the cylindrical parabola focal position 23 is in the LED light-emission region 218. Light discharged from the LED chips 210 is incident from the cylindrical parabolic block incident surface 31 to the cylindrical parabolic block 30 toward the cylindrical parabolic mirror 20, is reflected by the inner surface of the cylindrical parabolic mirror 20 and is shined on the lighting region 104 from the cylindrical parabolic block exit surface 32 as substantially parallel light rays.

Figure 13:
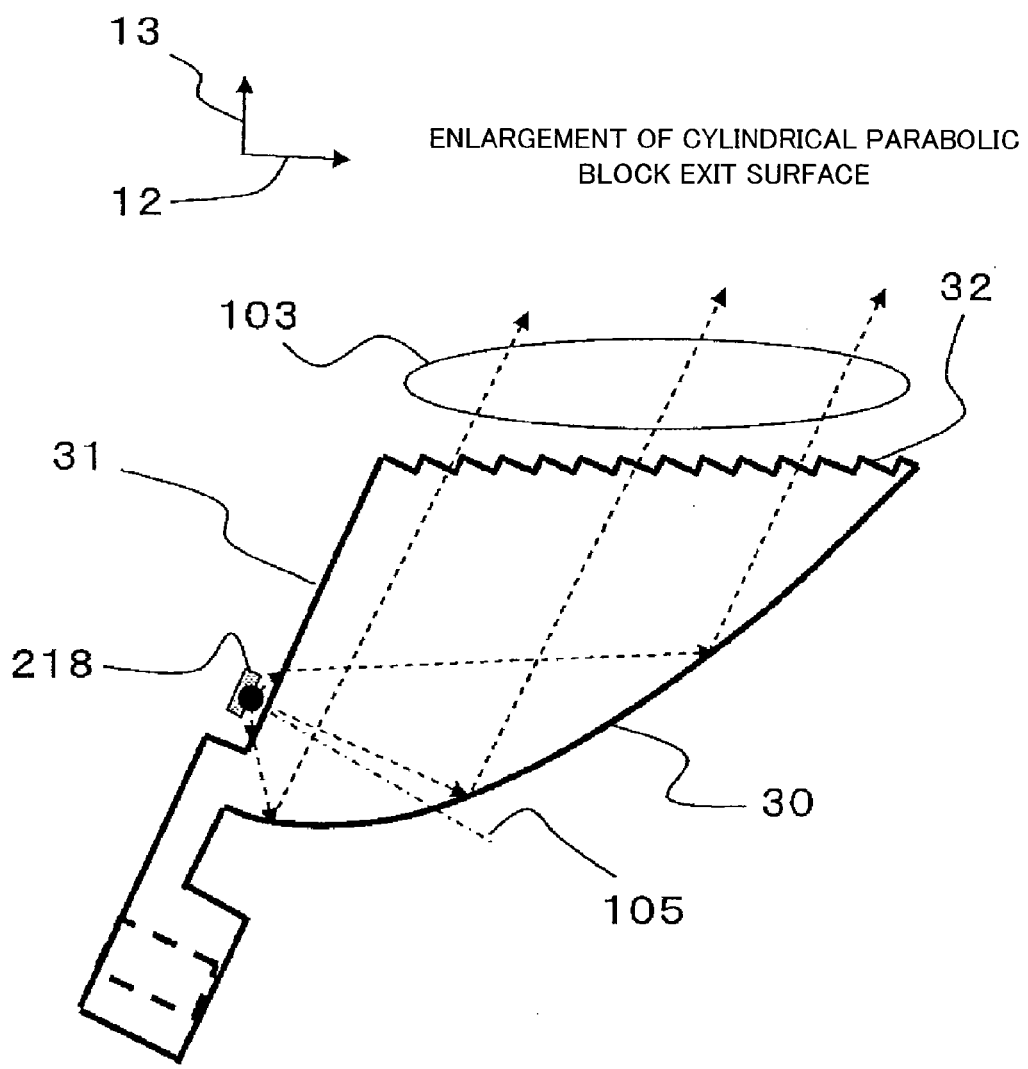
FIG. 13 is a detailed view of the light rays and a cylindrical parabolic block according to the fifth preferred embodiment of the present invention.

FIG. 13 shows a detailed view of the light rays and the cylindrical parabolic block 30. Consider the case in which the cylindrical parabolic block incident surface 31 is parallel to the cylindrical parabola axial plane 25 and is positioned orthogonal to the central axis 105 of the LED chips 210 in the light-emission direction. The cylindrical parabolic block 30 is formed of resin and/or the like and thus has a refractive index higher than air. Consequently, light emitted from the LED light-emission region 218 when incident on the cylindrical parabolic block 30 is refracted in the direction of the central axis 105 in the light-emission direction of the LED chips 210 by the cylindrical parabolic block incident surface 31. As a result, the divergence angle of the cylindrical parabolic block 30 becomes narrower, arriving at the cylindrical parabolic mirror 20.

Accordingly, more light rays reach the cylindrical parabolic mirror 20 than the cylindrical parabolic mirror 20 positioned in the air shown in FIG. 5 and are reflected as substantially parallel light rays, making it possible to more efficiently use LED light. Furthermore, the cylindrical parabolic block exit surface 32 is formed in a prism shape comprising a surface substantially orthogonal to and a surface substantially parallel to the light rays reflected by the cylindrical parabolic mirror 20, so it is possible to emit light rays without changing the angle of light rays reflected by the cylindrical parabolic mirror 20.

Sixth Preferred Embodiment

Figure 14:
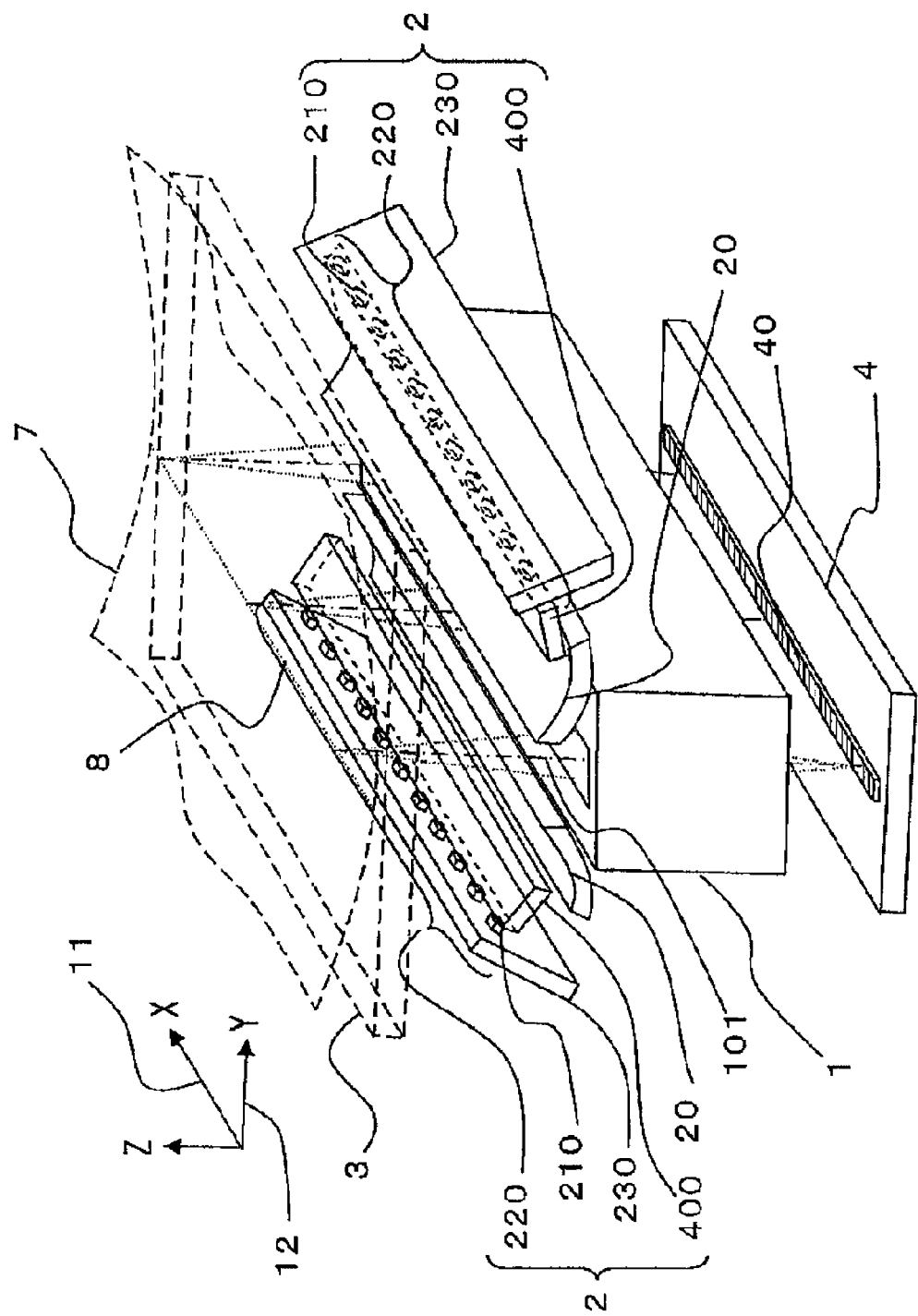
FIG. 14 is a perspective view of an image scanning device according to a sixth preferred embodiment of the present invention.

FIG. 14 is a perspective view of an image scanning device according to a sixth preferred embodiment of the present invention. The image scanning device comprises a top glass sheet 3, a lighting unit 2 and an imaging optical system 1. The top glass sheet 3 is a transparent glass plate for supporting an object being scanned, such as a document 7. The lighting unit 2 is a unit for accomplishing linear lighting of the surface of the document 7. The imaging optical system 1 is a unit for imaging light from the document 7 onto an imaging element 40.

In this preferred embodiment, the lighting unit 2 comprises an LED array 220, an LED substrate 230, a light guide plate 400 and a cylindrical parabolic mirror 20. The LED array 220 comprises LED chips 210 that are LED light sources lined up linearly in the main scanning direction. The LED substrate 230 is a substrate on which LED array 220 is mounted. The light guide plate 400 guides light emitted from the LED array 220 to the cylindrical parabolic mirror 20. The cylindrical parabolic mirror 20 is a cylindrical concave mirror for turning light emitted from the light guide plate 400, that is to say light emitted from the LED chips 210 via the light guide plate 400, into substantially parallel light rays and shining the lighting light on a scan line 8.

Figure 15:
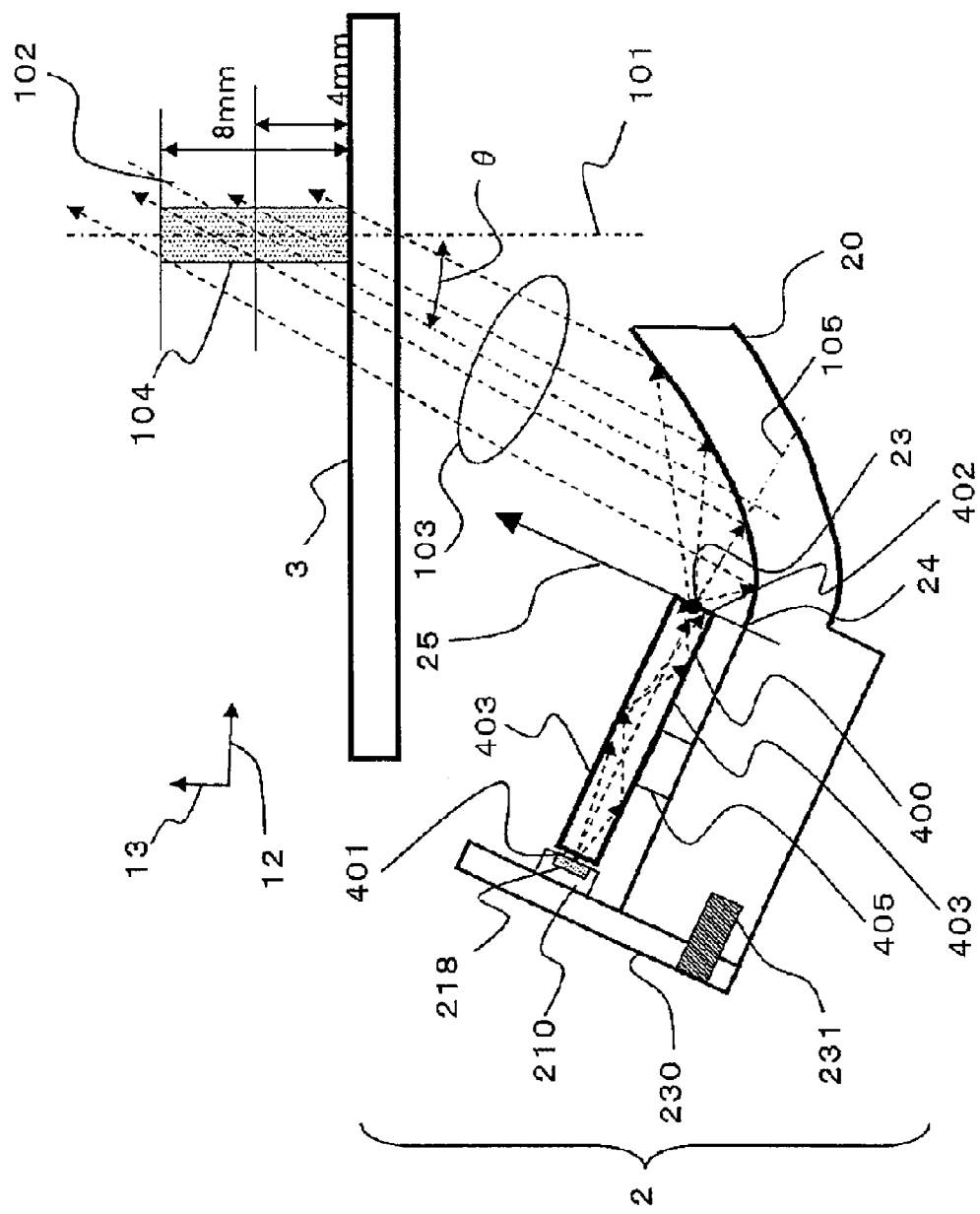
FIG. 15 is a light path diagram of the sub-scanning direction cross-section according to the sixth preferred embodiment of the present invention.

FIG. 15 is a light path diagram of the sub-scanning direction cross-section according to the sixth preferred embodiment of the present invention. The LED light-emission region 218 is positioned adjacent to the light guide plate incident surface 40 that is one side end of the light guide plate 400. The light guide plate 400 is a parallel planar substrate composed of plate-shaped transparent material extending in the main scanning direction, and the surface opposite the surface adjacent to the LED chips 210, in other words the light guide exit surface 402, is positioned at a position including the cylindrical parabola focal position 23. The lighting light rays 103 emitted from the light guide plate exit surface 402 near the cylindrical parabola focal position 23 are reflected by the cylindrical parabolic mirror 20, pass through the top glass sheet 3 as substantially parallel light rays and reach the lighting region 104. Here, it is necessary for the lighting unit 2 to be such that in general the lighting optical axis 102 is inclined from the imaging optical axis 101, in order to prevent interference with the imaging optical axis 101. Furthermore, because of assembly errors in the lighting unit 2 and the imaging optical system 1, the lighting region 104 is a region spreading out in the sub-scanning direction 12, and moreover in order to cope with book manuscripts and wrinkles in and floating of the document, when the focal depth becomes larger, the lighting region 104 widens in the depth direction 13 also. Consequently, with the lighting unit 2 there is a certain degree of width in the sub-scanning direction 12 and uniform, substantially parallel light rays are necessary.

Here, with the lighting unit 2 in the sixth preferred embodiment it is possible to set the lighting width in the sub-scanning direction 12 by combining the width of the light guide plate exit surface 402 in the cylindrical parabolic mirror axial plane direction in addition to the inclination θ of the imaging optical axis 101 to the lighting optical axis 102 and the focal length of the cylindrical parabolic mirror 20. In the first through fifth preferred embodiments, the size of the light-emission region of the LED was directly related to the lighting width in the sub-scanning direction 12, but in this sixth preferred embodiment, it is possible to set the lighting width in the sub-scanning direction without relation to the size of the light-emission region of the LED. That is to say, in a white LED obtaining white light by blending secondary light emission from a yellow fluorescent material having a blue light-emitting diode as a light source, even when the light-emission regions differ between the blue light and the green to red light, by using the light guide plate 400 it is possible to accomplish uniformity in directionality and it is possible to make the lighting widths in the sub-scanning direction match. Accordingly, it is possible to have the same amount of change in the blue light and the green to red light even with respect to the change in illumination in the depth direction.

Accordingly, with this composition lighting light that is nearly parallel light is obtainable. Through this, it is possible to efficiently light the document and it is possible to obtain a bright image even when the distance from the document is separated, because the light amount change is small in the depth direction of the imaging optical system. Furthermore, when the LED light source is a white LED that obtains white light by blending secondary light from a yellow fluorescent material with a blue light-emitting diode as the light source, because the light-emission regions differ, differences arise in directionality between the blue light and the green to red light, but through the light guide plate 400, it is possible to accomplish uniformity in directionality. Through this, it is possible to make the amount by which the illumination distribution in the sub-scanning direction changes in the depth direction the same regardless of the color of light.

The LED substrate 230 and light guide plate 400 are respectively anchored to the cylindrical parabolic mirror 20 by a position-determining pin 231 and a light guide plate supporter 405, and the positional relationship thereof is maintained.

Seventh Preferred Embodiment

Figure 16:
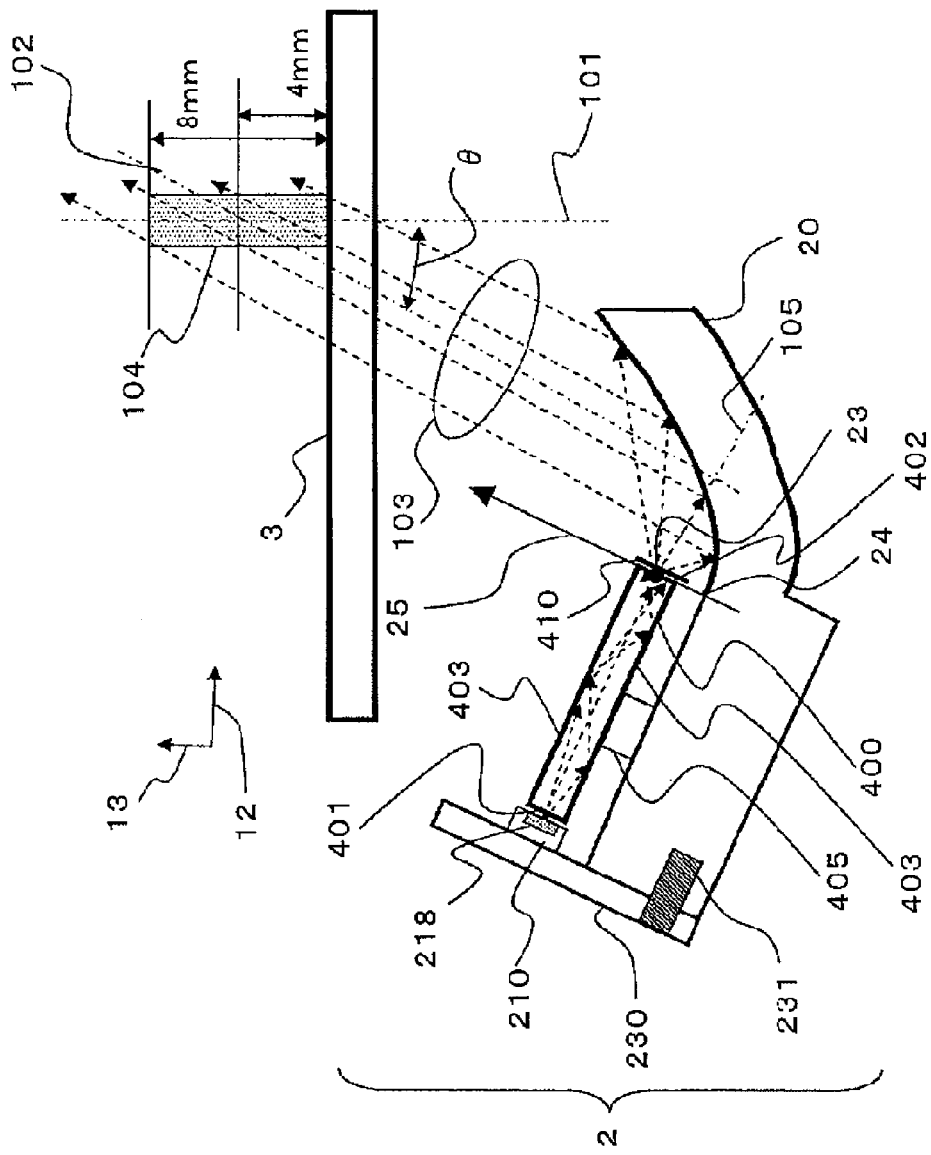
FIG. 16 is a light path diagram of the sub-scanning direction cross-section according to a seventh preferred embodiment of the present invention.

FIG. 16 is a light path diagram of the sub-scanning direction cross-section according to a seventh preferred embodiment of the present invention. In this seventh preferred embodiment, a scatterer 410 is disposed covering the light guide plate exit surface 402, adjacent to the light guide plate exit surface 402. Here, the scatterer 410 has a thin plate shape and embossing or bead application processing is implemented on a sheet surface made of resin and/or the like. In addition, as the scatterer 410, it would be fine to utilize one in which direct embossing or bead application processing has been done on the light guide plate exit surface 402.

FIG. 17 is an example of the sub-scanning direction illumination distribution (a) and the illumination change in the depth direction (b) when there is no scatterer 410 and the light guide distance of the light guide plate 400 (the distance between the incident surface and exit surface) is short. With the light guide plate 400, light emitted from the LED chips 410 is reflected by a light guide surface 403, and standardization of directionality of the emitted light and uniformity of the light intensity at the light guide exit surface are accomplished with multiple reflections. When the light guide distance is short, the number of reflections by the light guide surface 403 is small and light emitted from the light guide has a directional distribution in accordance with the number of reflections. As a result, the sub-scanning direction illumination distribution becomes a wavy distribution in accordance with the above-described number of reflections in the sub-scanning direction, as shown in FIG. 17 (*a*), and the lighting light proceeds in the depth direction 13 while gradually widening in the sub-scanning direction 12. Consequently, the change in illumination in the depth direction 13 at a position 0 mm in the sub-scanning direction has wavy changes, as shown in FIG. 17 (*b*). Consequently, the lighting illumination achieves non-monotone change even with white paper documents whose distance from the document surface to the top glass sheet 3 changes continuously. As a result, a shading distribution occurs in the scanned image.

With the seventh preferred embodiment, because the scatterer 410 is positioned covering the light guide plate exit surface 402, adjacent to the light guide plate exit surface 402, the directional distribution of the light guide exit light is eased or is converted into a substantially even scattering distribution by the scatterer 410. Consequently, light that has passed through the scatterer 410 has a smooth directionality distribution. As shown in FIG. 17(*c*), the sub-scanning direction illumination distribution is no longer a wavy distribution, and as a result, monotone illumination changes occur in the depth direction, as shown in FIG. 17(*d*). Through this, it is possible to scan with a monotone density change white paper documents in which the distance from the top glass sheet 3 to the document surface continuously changes. If there is this kind of monotone density change in the depth direction, it is possible to reproduce the original density distribution of the document with simple corrections.

Eighth Preferred Embodiment

Figure 18:
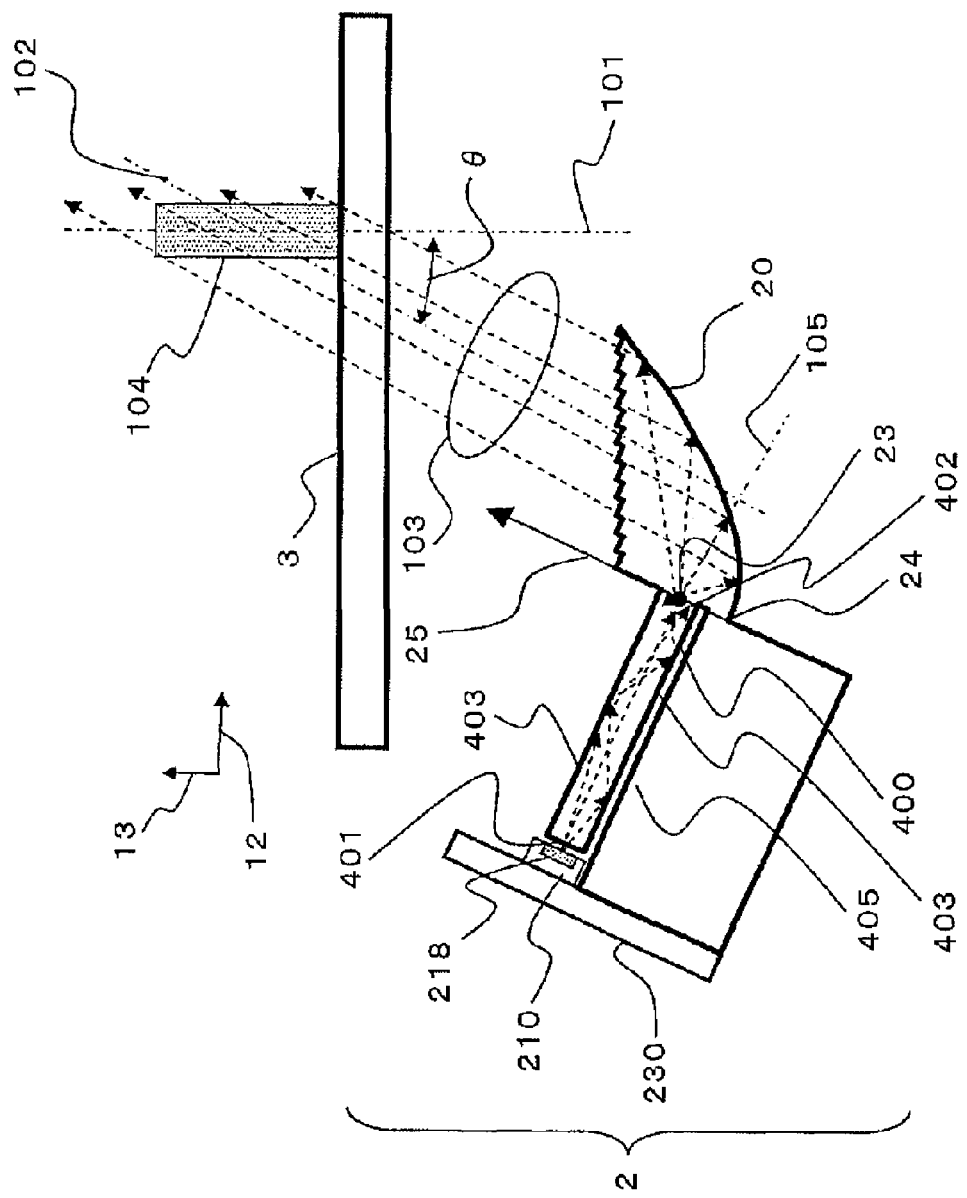
FIG. 18 is a cross-sectional view of a lighting unit according to an eighth preferred embodiment of the present invention.

FIG. 18 is a cross-sectional view of a lighting unit according to an eighth preferred embodiment of the present invention. With the lighting unit according to the eighth preferred embodiment of the present invention, a cylindrical parabolic block 30, which is a solid block in which a cylindrical parabolic mirror 20 is made of transparent resin, and a light guide plate 400 are formed as a single body. Similar to the eighth preferred embodiment, the cylindrical parabola focal position 23 is at the exit surface 402 of the light guide plate 400. Hence, the light guide exit surface 400 is equivalent to the joining position of the light guide plate 400 and the cylindrical parabolic block 30. Because the cylindrical parabolic block 30 and the light guide plate 400 are formed as a single body as described above, the light guide exit surface 402 does not exist as a physical surface. Light emitted from the LED chip 210 is incident on the light guide plate 400, passes through the light guide exit surface 402 toward the cylindrical parabolic mirror 20 and is incident on the cylindrical parabolic block 30. Light rays internally reflected by the cylindrical parabolic mirror 20 are projected onto the lighting region 104 from the cylindrical parabolic block exit surface 32 as substantially parallel light rays.

It is possible to emit light rays without changing the angle of the light rays reflected by the cylindrical parabolic mirror 20 by forming the cylindrical parabolic block exit surface 32 into a prism shape comprising a surface substantially parallel to and a surface substantially orthogonal to the light rays reflected by the cylindrical parabolic mirror 20.

Accordingly, with this composition, positioning the emission exit positions of the light guide plate and the parabolic mirror is possible by integrated formation, and it is possible to eliminate variances caused by assembly.

Ninth Preferred Embodiment

Figure 19:
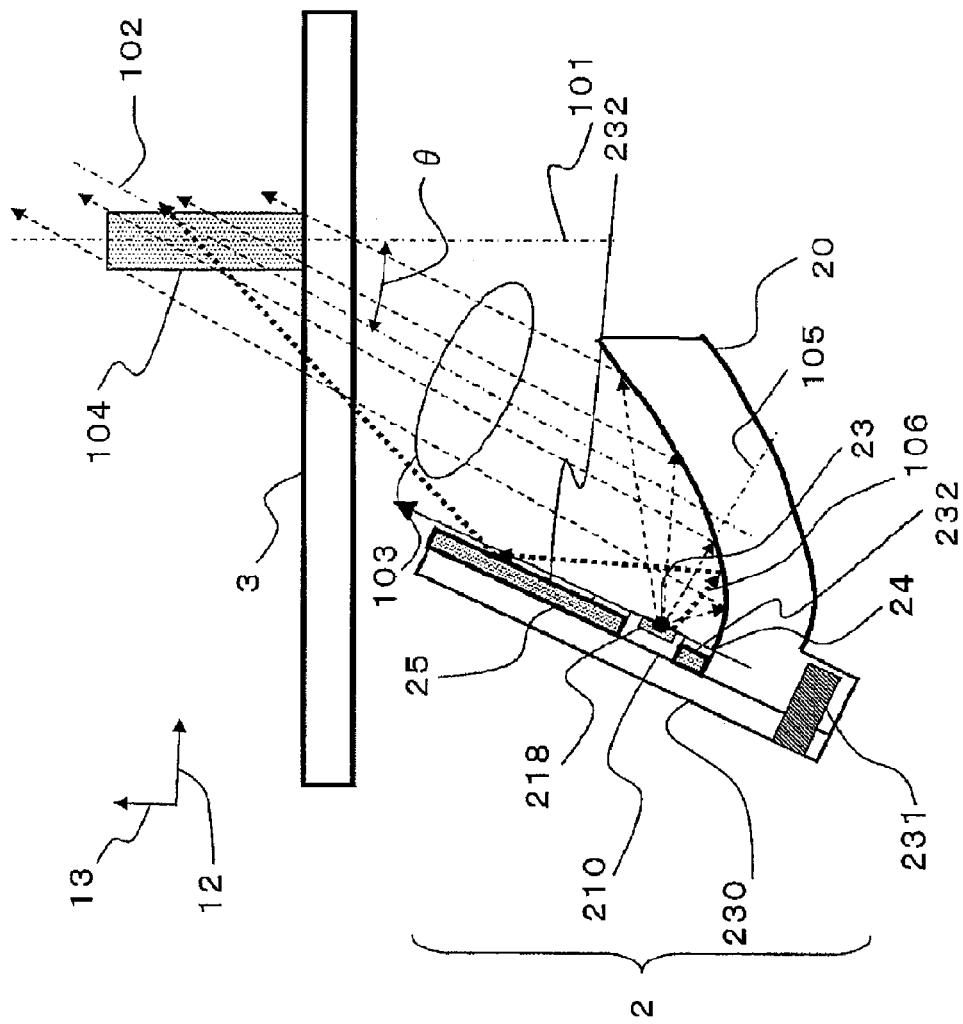
FIG. 19 is a sub-scanning direction cross-sectional view of a lighting unit according to a ninth preferred embodiment of the present invention.

FIG. 19 is an sub-scanning direction cross-sectional view of a lighting unit according to a ninth preferred embodiment of the present invention. In the ninth preferred embodiment of the present invention, an LED substrate 230 comprises a reflective sheet 232 that is all or a portion of the region in which LED chips 210 are not mounted on the surface in which the LED chips 210 are mounted. Through this composition, it is possible to guide a portion of the light hitting the LED substrate 230 to the lighting region 104, such as lighting light rays 106 from the LED light-emission region not at the focal position of the cylindrical parabolic mirror 20, out of light emitted from the LED chips 210, so it is possible to efficiently light a document.

Here, it would be fine for the reflective sheet 232 to reflect the wavelength of light emitted from the LED chips 210, and it is possible to use a metal plate such as an aluminum plate and/or the like, or a resin scattering sheet and/or the like. When a metal plate such as an aluminum plate and/or the like is used, it is possible for this to also be used as a heat-radiating body that dissipates heat generated from the LED chips 210.

Tenth Preferred Embodiment

Figure 20:
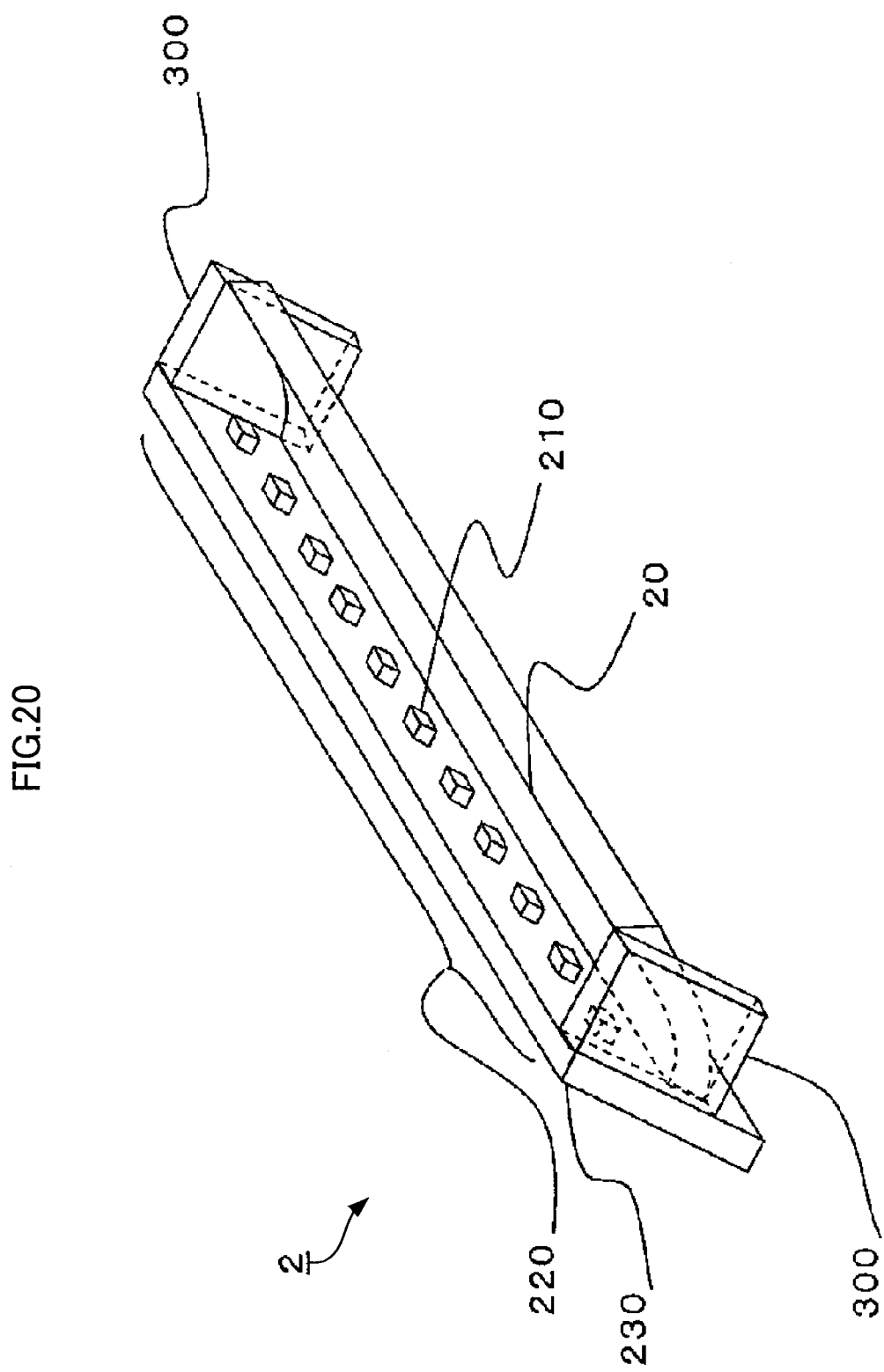
FIG. 20 is a perspective view of a lighting unit according to a tenth preferred embodiment of the present invention.

FIG. 20 is a perspective view of a lighting unit according to a tenth preferred embodiment of the present invention. The lighting unit according to the tenth preferred embodiment is provided with a reflective mirror 300 at both ends of the cylindrical parabolic mirror 20 in the main scanning direction. The cylindrical parabolic mirror 20 does not have curvature in the main scanning direction. Consequently, when there is no reflective minor 300, the portion of the light rays emitted from the LED array 220 in the main scanning direction progresses without refracting, and progresses to the outside of the lighting unit 2 from the end surfaces of the cylindrical parabolic mirror 20 in the main scanning direction. As a result, these light rays reach the outside of the scan line 8 of the document 7 (see FIG. 1) in the main scanning direction and are not effectively utilized as lighting light. Hence, by providing the reflective mirror 300, light progressing to the outside of the cylindrical parabolic mirror 20 in the main scanning direction is reflected and through this it is possible to effectively utilize the light as lighting light by returning a portion of the light to the scan line 8 of the document 7.

Figure 21:
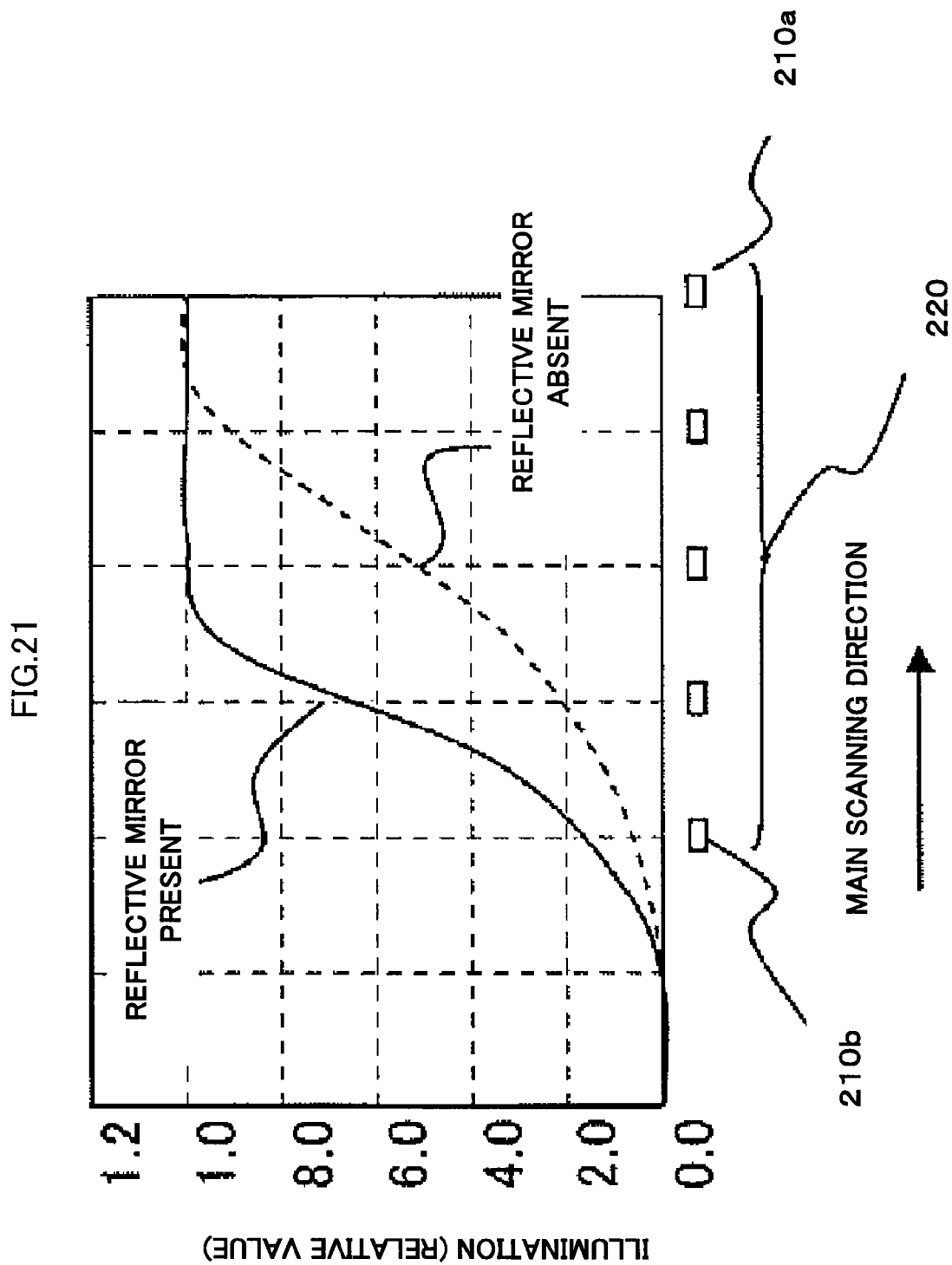
FIG. 21 is a drawing showing the illumination distribution of the main scanning direction end according to the tenth preferred embodiment of the present invention.

FIG. 21 is a drawing showing the illumination distribution at the main scanning direction end according to the tenth preferred embodiment of the present invention. In this drawing, the horizontal axis is the main scanning direction and shows the positions of the LED 210*a* of the corresponding LED array 220 and the end LED 210*b* positioned at the main scanning direction end. When there is no reflective minor 300, because a large amount of light leaks to the outside from the end LED 210*b*, illumination in the main scanning direction decreases toward the end to the inside of the end LED 210*b*. On the other hand, when there is a reflective mirror 300, it is possible to increase the lighting light amount at the main scanning direction end by reflecting light progressing to the outside in the main scanning direction. As a result, by providing the reflective mirror 300, it is possible to lengthen the region where the main scanning direction illumination is constant to close to the end LED 210*b*.

Accordingly, through this composition it is possible to increase the lighting light amount of the main scanning direction end, and thus it is possible to effectively shorten the length of the lighting unit in the main scanning direction.

Eleventh Preferred Embodiment

Figure 22:
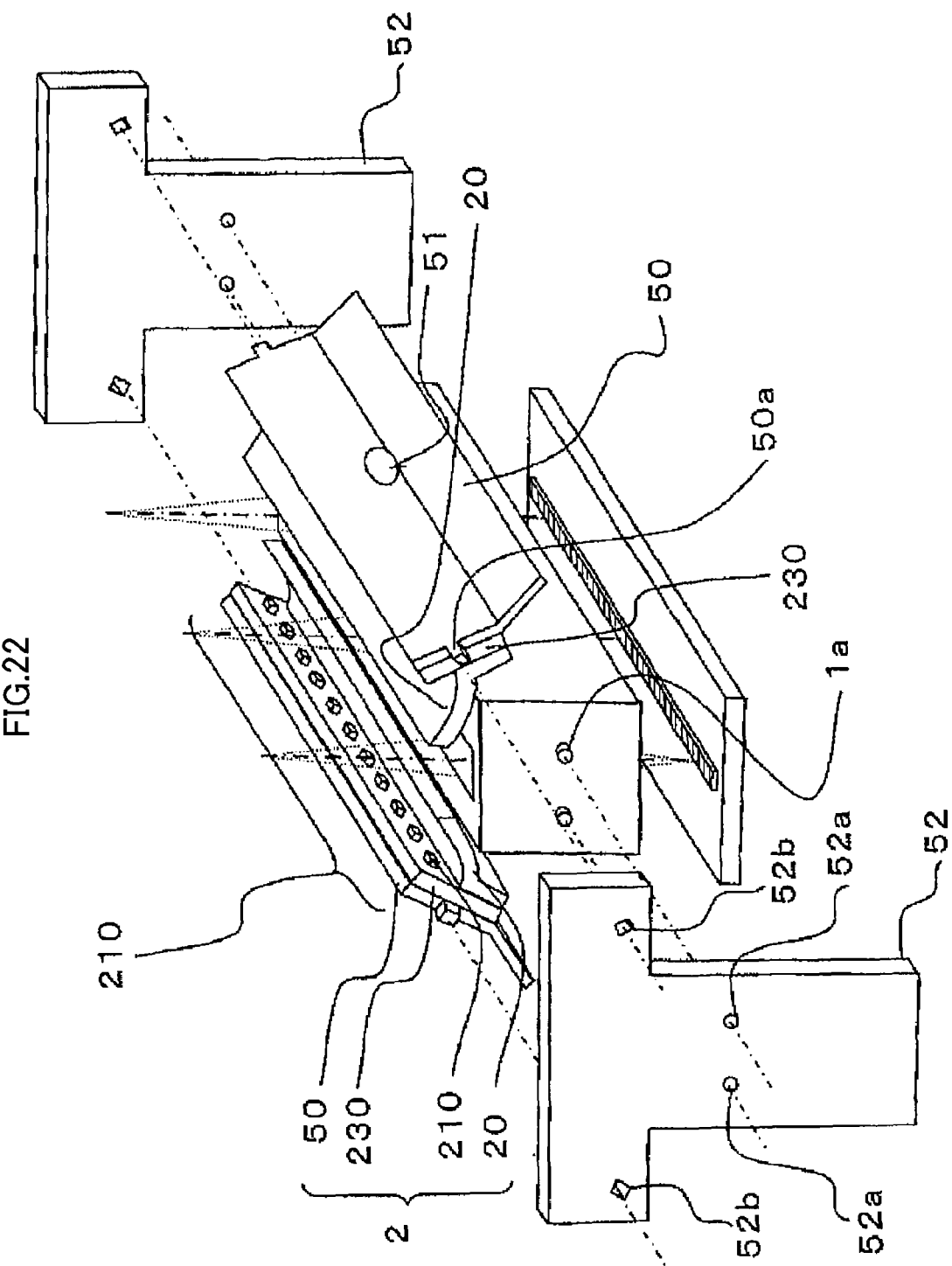
FIG. 22 is a perspective view of an image scanning device according to an eleventh preferred embodiment of the present invention.
Figure 23:
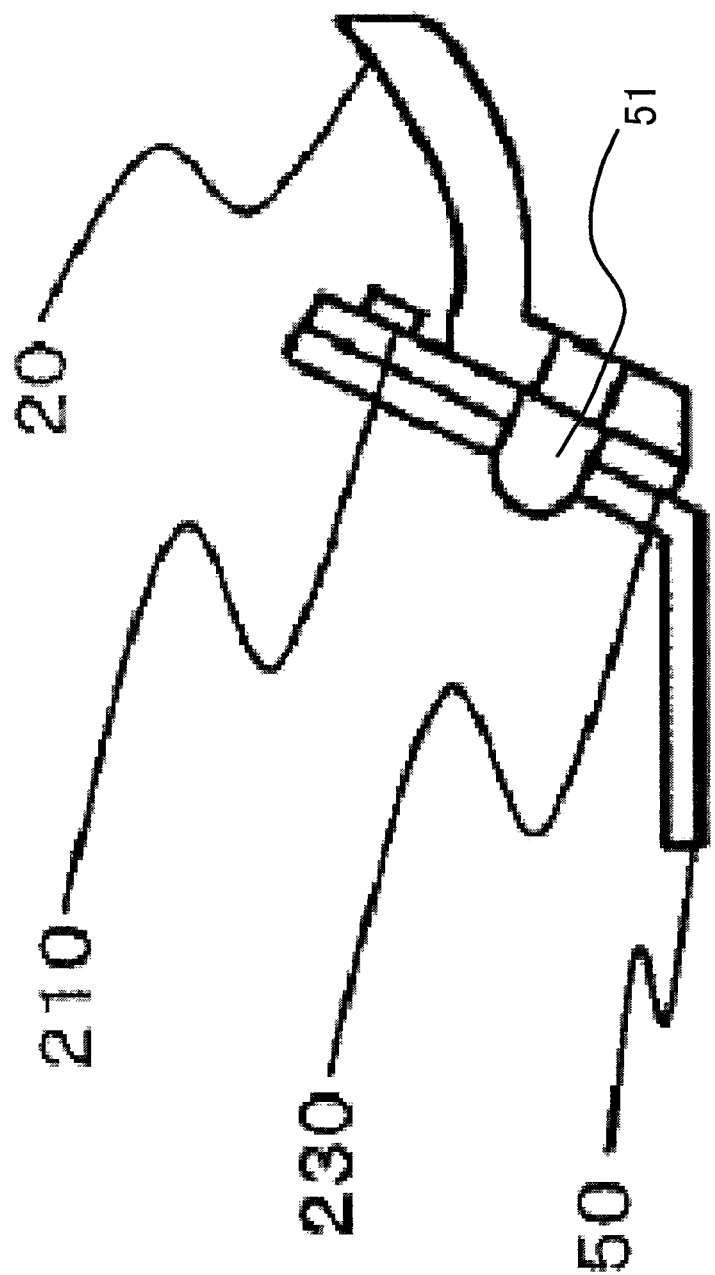
FIG. 23 is a sub-scanning direction cross-sectional view of a lighting unit according to the eleventh preferred embodiment of the present invention.

FIG. 22 is a perspective view of an image scanning device according to an eleventh preferred embodiment of the present invention. In addition, FIG. 23 is an sub-scanning direction cross-sectional view of a lighting unit according to the eleventh preferred embodiment of the present invention. The image scanning device according to the eleventh preferred embodiment of the present invention is the lighting unit of the first preferred embodiment of the present invention, provided with heat-radiating plates. With this preferred embodiment, plate-shaped heat-radiating plates 50 formed of metal such as aluminum on the opposite surface as the mounting surface of the LED chips 210 of the LED array 230 are positioned adhered to the LED substrate, as shown in FIGS. 22 and 23. In addition, the cylindrical parabolic mirror 20, the LED substrate 230 and the heat-radiating plates 50 are joined into one body by joining screws 51.

As shown in FIG. 22, the image scanning device according to the eleventh preferred embodiment comprises imaging optical system position-determining protrusions 1*a*, lighting system position-determining protrusions 50*a*, imaging optical system position-determining holes 52*a* and lighting system position-determining holes 52*b*. The imaging optical system position-determining protrusions 1*a* are provided in the imaging optical system 1. The lighting system position-determining protrusions 50*a* are provided in the heat-radiating plates 50. The imaging optical system position-determining holes 52*a* and the lighting system position-determining holes 52*b* are provided in structural support plates 52. The imaging optical system position-determining protrusions 1*a* interlock into the imaging optical system position-determining holes 52*a*, and the lighting system position-determining protrusions 50*a* interlock into the lighting system position-determining holes 52*b*. Through this, the imaging optical system 1 and the lighting unit 2 are anchored.

The heat-radiating plates 50 are adhered and attached to the LED substrate 230 on the surface opposite the mounting surface of the LED chips 210 of the LED substrate 230. Through this, heat generated by the LED chips 210 is efficiently discharged to the heat-radiating plates 50 and increases in the temperature of the LED chips 210 are controlled. As a result, stable operation of the lighting unit and the image scanning device becomes possible.

In addition, only a portion of the heat-radiating plates 50 abuts the housing and half is separated from the housing, so that heat from the LED chips 210 does not reach the housing. Accordingly, light receptors provided in the bottom of the housing do not experience an increase in temperature, so it is possible for the light receptors to receive image information from the document 7 with good sensitivity.

It would be fine for the heat-radiating plates 50 of the eleventh preferred embodiment of the present invention to be provided in the lighting unit 2 of each of the second through tenth preferred embodiments of the present invention. Through this, similar efficacy is obtained.

Twelfth Preferred Embodiment

Figure 24:
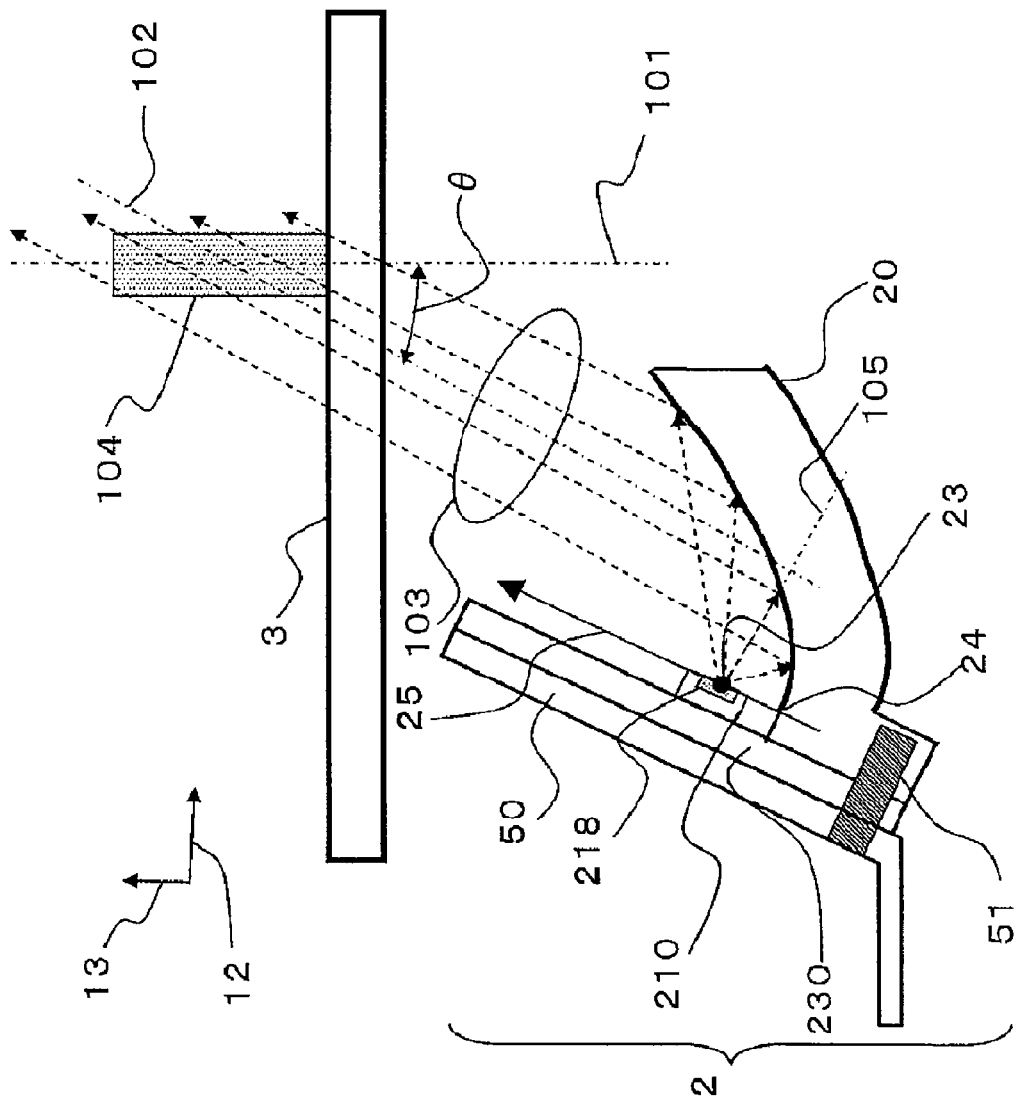
FIG. 24 is a sub-scanning direction cross-sectional view of a lighting unit according to a twelfth preferred embodiment of the present invention.

FIGS. 24 and 25 are respectively sub-scanning direction cross-sectional views of a lighting unit and an image scanning device provided with such a lighting unit according to a twelfth preferred embodiment of the present invention. The image scanning device according to the twelfth preferred embodiment comprises a top glass sheet 3, a lighting unit 2, first lens mirrors 507, flat mirrors 508, apertures 509, openings 510, second lens mirrors 511, sensor ICs 512, a first sensor substrate 513*a*, a second sensor substrate 513*b*, signal processing ICs (ASIC) 514, electronic components 515, a housing 516 and a bottom plate 517.

The top glass sheet 3 is a transparent glass plate that supports a document 7 such as literature, media and/or the like. The lighting unit 2 is the same as the lighting unit 2 according to the eleventh preferred embodiment, is a unit for accomplishing linear lighting on the surface of the document, and comprises LED chips 210, an LED substrate 230, heat-radiating plates 50 and a cylindrical parabolic mirror 20.

The LED chips 210 are light sources for shining light. The LED substrate 230 is a substrate to which the LED chips 210 are anchored and which is provided with wiring for supplying electric current to the LED chips 210. The heat-radiating plates 50 receive heat generated by the LED chips 210 via the LED substrate 230 and dissipate this heat into the air. The cylindrical parabolic mirror 20 has a mirror surface that causes light generated by the LED chips 21 in the direction of the document supported by the top glass sheet 3 to be reflected as approximately parallel light.

The first lens mirrors (also called the first lenses) 507 are concave first lens mirrors that receive divergent light from the document 7. The flat mirrors 508 receive approximately parallel light from the first lenses 507 and reflect this light. The apertures 509 receive approximately parallel light from the flat mirrors 508, block light at the periphery and restrict the light passing through. The openings 510 are provided on the surface of the apertures 509 or close thereto and are a part in which is provided an opening through which light received by the apertures 509 is allowed to pass. The second lens mirrors (also called the second lenses) 511 are concave second lens mirrors for receiving and condensing light passing through the apertures 509.

The second ICs 512 (also called light receivers) receive light reflected from the second lens mirrors 511 that has passed through the openings 510, and are sensor ICs (Integrated Circuits) having a MOS semiconductor composition comprising a photoelectric conversion circuit for accomplishing photoelectric conversion and a driver. The first sensor substrate 513a and the second sensor substrate 513b are sensor substrates on which the sensor ICs 512 are mounted, and are respectively positioned lined up in the sub-scanning direction, as shown in FIG. 25. The signal processing ICs (ASIC) 514 are ICs for accomplishing signal processing on signals photoelectrically converted by the sensor ICs 512. The electronic components 515 are capacitors, resistors and/or the like mounted on the sensor substrates 513. The housing 516 is a hollow member to which the imaging optical system that is the imaging means comprising the sensor ICs and mirrors is anchored. The bottom plate 517 is a plate-like member covering the bottom opening of the housing 516 and to which the lenses and housing 516 are anchored.

The action of the optical system of the image scanning device according to the twelfth preferred embodiment of the present invention will be explained. Light from the LED chips 210 is reflected by the cylindrical parabolic mirror 20 and shines on the document 7 as approximately parallel light. Scattered light reflected by the document 7 is inclined to one side in the sub-scanning direction (in the leftward direction in FIG. 25) and is reflected as collimated light. Light from the first lens 507 is reflected to the flat mirror 508 inclined to one side in the sub-scanning direction. Light from the flat mirror 508 shines on the window (opening 510) of the aperture 509 as approximately parallel light rays. Furthermore, light radiating from the window 510 is reflected to the second lens 511 inclined to one side in the sub-scanning direction, and because this light is incident on the sensor IC 512 for each beam, the image information is imaged as an inverted image on the light-receiving surface of the sensor IC 512.

Scattered light shining from the left-side lighting unit 2 and reflected by the document 7 that is the subject of illumination is inclined toward the other side (the left direction in FIG. 25) in the sub-scanning direction, and is incident on the sensor IC 512 on the first sensor substrate 513a. Scattered light shining from the right-side lighting unit 2 and reflected by the document 7 that is the subject of illumination follows a light path symmetrical to the light path shown in FIG. 25 on a plane orthogonal to the sub-scanning direction and is incident on the sensor IC 512 on the second sensor substrate 513b. Consequently, the light path incident on the sensor IC 512 mounted on the first sensor substrate 513a and the light path incident on the sensor IC 512 mounted on the second sensor substrate 513b do not intersect and thus it is possible to prevent light ray interference in the light path.

In the twelfth preferred embodiment of the present invention, the lighting unit 2 explained in the eleventh preferred embodiment of the present invention is used, but similar efficacy and results are obtained by using the lighting unit explained in the first through tenth preferred embodiments of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of priority based on Japanese Patent Application No. 2011-234079, filed on Oct. 25, 2011, the entire disclosure of which is incorporated by reference herein.

REFERENCE SIGNS LIST

1 Imaging optical system, 1a Imaging optical system position-determining protrusion, 2 Lighting unit, 3 Top glass sheet, 4 Substrate, 7 Document, 8 Scan line, 11 Main scanning direction, 12 Sub-scanning direction, 13 Depth direction, 20 Cylindrical parabolic mirror, 21 Semi-cylindrical parabola y+, 22 Semi-cylindrical parabola y−, 23 Cylindrical parabola focal position, 24 Cylindrical parabola vertex, 25 Cylindrical parabola axial plane, 30 Cylindrical parabolic block, 31 Cylindrical parabolic block incident surface, 32 Cylindrical parabolic block exit surface, 40 Imaging element, 50 Heat-radiating plate, 50a Lighting system position-determining protrusion, 51 Joining screw, 52 Structural support plate, 52a Imaging optical system position-determining hole, 52b Lighting system position-determining hole, 101 Imaging optical axis, 102 Lighting optical axis, 103 Lighting light rays, 104 Lighting region, 105 Central axis in light-emission direction, 210 LED chip, 211 LED package, 212 Blue light-emitting diode, 213 Yellow fluorescent material, 214 Blue light-emitting diode short axis, 215 Blue light-emitting diode long axis, 216 LED package top surface, 217 Yellow fluorescent material strong light-emission region, 218 LED light-emission region, 210, 210a, 210b LED chip, 220 LED array, 230 LED substrate, 231 Position-determining pin, 232 Reflective sheet, 300 Reflective mirror, 400 Light guide plate, 401 Light guide plate incident surface, 402 Light guide plate exit surface, 403 Light guide surface, 405 Light guide plate supporter, 410 Scatterer, 507 Concave first lens mirror (first lens), 508 Flat minor, 509 Aperture, 510 Opening, 511 Concave second lens mirror (second lens), 512 Sensor IC (light receiver), 513 Sensor substrate, 513a First sensor substrate, 513b Second sensor substrate, 514 Signal processing IC (ASIC), 515 Electronic components, 516 Housing, 517 Bottom plate

The invention claimed is:

1. A lighting unit, comprising:
a light source in which light-emitting elements are positioned in an array in a main scanning direction;
a light source substrate that is a substrate extending in the main scanning direction and comprises a light-emitting element mounting section on which the light source is disposed and a non-light-emitting element mounting section extending from the light-emitting element mounting section in a direction orthogonal to the main scanning direction;

a parabolic mirror forming a shape in which a cylindrical paraboloid having curvature with respect to an sub-scanning direction has been clipped by an axial plane that is perpendicular to the vertex of the cylindrical paraboloid in the main scanning direction, provided with an anchoring section provided at the vertex of the cylindrical paraboloid and extending in the outside direction of the cylindrical paraboloid from the vertex, and projecting light emitted from the light source on an illumination region of an illuminated item; and a heat-radiating plate extending in the main scanning direction and possessing a contact section that is in contact with the surface opposite the surface on which the light-emitting elements of the light source substrate are mounted, and a non-contact section;

wherein the light source is positioned so as to include the focal position of the cylindrical paraboloid in the light-emitting region of light, the central axis in the light-emitting direction of the light being perpendicular to the axial plane; and the non-light-emitting element mounting section of the light source substrate is interposed between the contact section of the heat-radiating plate and the anchoring section of the parabolic mirror.

2. The lighting unit according to claim 1, wherein:
the light source is disposed in a surface facing the parabolic mirror on the light source substrate positioned parallel to the axial plane; and
the light source substrate is anchored to the anchoring section of the parabolic mirror by position-determining pins.

3. The lighting unit according to claim 1, wherein:
the light source is a white LED that obtains white color by blending secondary light from a yellow fluorescent material, with a blue light-emitting diode as the light-emitting element; and
the short axis direction of the chips of the blue light-emitting diode is positioned so as to be parallel to the main scanning direction.

4. The lighting unit according to claim 1, wherein:
the light source is a white LED that obtains white color by blending secondary light from a yellow fluorescent material, with a blue light-emitting diode as the light-emitting element; and
the area of the blue light-emitting diode chip on the vertex side of the parabolic mirror matches the focal position of the parabolic mirror.

5. The lighting unit according to claim 1, wherein the parabolic mirror is formed of a solid transparent material.

6. The lighting unit according to claim 1, further comprising a light guide plate for guiding light emitted from the light source;
wherein the parabolic mirror shines light via the light guide plate emitted from the light source on the illumination region of the illuminated item.

7. The lighting unit according to claim 6, wherein a scatterer for scattering light is disposed between the light guide plate and the parabolic mirror.

8. The lighting unit according to claim 6, wherein the parabolic mirror is formed of a solid transparent material and is formed as a single body with the light guide plate.

9. The lighting unit according to claim 1, wherein a reflective sheet is provided in an area other than the light source mounting area of the light source mounting surface of the light source substrate.

10. The lighting unit according to claim 1, wherein a reflective mirror is provided at the end of the parabolic mirror in the main scanning direction.

11. The lighting unit according to claim 1, wherein the non-contact section of the heat-radiating plate extends in a direction parallel to the main scanning direction, continuing to the contact section from the end side on the side opposite the light-emitting element mounting section of the light source substrate.

12. An image scanning device, comprising:
the lighting unit according to claim 1;
an imaging optical system on which scattered light from light reflected by a document in the illumination region of the illuminated object is incident, and which images an image of the illuminated item in a light receptor extending in the main scanning direction; and
a housing for housing or supporting the lighting unit, the imaging optical system and the light receptor;
being an image scanning device for scanning the document relative to the sub-scanning direction orthogonal to the main scanning direction and obtaining image information of the illuminated item; and
wherein the lighting unit is positioned on both sides of the optical axis of the imaging optical system in the main scanning direction.

13. The image scanning device according to claim 12, wherein the lighting unit is positioned such that the illumination direction of light exiting from the lighting unit is symmetrical with respect to the optical axis of the imaging optical system.

* * * * *